(12) United States Patent
Abate et al.

(10) Patent No.: US 10,029,256 B2
(45) Date of Patent: Jul. 24, 2018

(54) VALVES AND OTHER FLOW CONTROL IN FLUIDIC SYSTEMS INCLUDING MICROFLUIDIC SYSTEMS

(71) Applicant: President and Fellows of Harvard College, Cambridge, MA (US)

(72) Inventors: Adam R. Abate, San Francisco, CA (US); David A. Weitz, Bolton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 50 days.

(21) Appl. No.: 15/148,955

(22) Filed: May 6, 2016

(65) Prior Publication Data

US 2016/0250638 A1    Sep. 1, 2016

Related U.S. Application Data

(63) Continuation of application No. 12/992,376, filed as application No. PCT/US2009/003024 on May 15, 2009, now Pat. No. 9,358,539.
(Continued)

(51) Int. Cl.
*B01L 3/00* (2006.01)
*F16K 99/00* (2006.01)
*B01L 3/02* (2006.01)

(52) U.S. Cl.
CPC ... *B01L 3/502738* (2013.01); *B01L 3/502746* (2013.01); *B01L 3/502784* (2013.01);
(Continued)

(58) Field of Classification Search
CPC ....... B01L 3/502738; B01L 2200/0605; B01L 2200/0636; B01L 2300/0867;
(Continued)

(56) References Cited

U.S. PATENT DOCUMENTS 3,556,138 A    1/1971   D'Urso
4,756,427 A    7/1988   Gohde et al.
(Continued)

FOREIGN PATENT DOCUMENTS

CN    1326549 A    12/2001
CN    1482369 A    3/2004
(Continued)

OTHER PUBLICATIONS

Hung, Lung-Hsia et al. "Alternating droplet generation and controlled dynamic droplet fusion in microfluidic device for CdS nanoparticle synthesis." Lab on a Chip (2006) 6 174-178. (Year: 2006).*
(Continued)

*Primary Examiner* — Christopher Adam Hixson
(74) *Attorney, Agent, or Firm* — Wolf, Greenfield & Sacks, P.C.

(57) ABSTRACT

Articles and methods for controlling flow in fluidic systems, especially in microfluidic systems, are provided. In one aspect, a microfluidic system described herein includes a configuration such that the actuation of a single valve can allow the switching of fluids from a first fluid path (e.g., a first channel section) to a second fluid path (e.g., a second channel section). This may be achieved, for example, by incorporating a valve with a first channel section, which may have a lower hydrodynamic resistance than a second channel section prior to actuation of the valve. Actuation of the valve can cause only the hydrodynamic resistance of the first channel section to increase, thereby redirecting fluid flow into the second channel section (which now has a relatively lower hydrodynamic resistance). In some embodiments, the valve comprises a control channel for introducing a positive or reduced pressure, and is adapted to modulate fluid flow in an adjacent channel section by constricting or expanding the
(Continued)

channel section. For example, the valve and/or the channel section may be formed in a flexible material and actuation of the valve may be achieved by applying a positive or reduced pressure to the valve to cause deformation of both the valve and the channel section. Another aspect of the invention includes articles and methods associated with manipulation of multiphase materials (e.g., dispersions). For instance, one or more valves may be combined with a flow focusing system so as to form droplets of different volumes and/or frequencies without the need to vary flow rates of the fluids when they are introduced into the fluidic system.

11 Claims, 16 Drawing Sheets

Related U.S. Application Data

(60) Provisional application No. 61/053,812, filed on May 16, 2008.

(52) U.S. Cl.
CPC ...... *F16K 99/0017* (2013.01); *F16K 99/0026* (2013.01); *F16K 99/0055* (2013.01); *B01L 3/0268* (2013.01); *B01L 2200/0605* (2013.01); *B01L 2200/0636* (2013.01); *B01L 2200/146* (2013.01); *B01L 2300/0816* (2013.01); *B01L 2300/0864* (2013.01); *B01L 2300/0867* (2013.01); *B01L 2400/0487* (2013.01); *B01L 2400/0655* (2013.01); *B01L 2400/082* (2013.01); *Y10T 436/2575* (2015.01)

(58) Field of Classification Search
CPC ..... B01L 2400/0487; B01L 2400/0655; F16K 99/0026; F16K 99/0055
See application file for complete search history.

(56) References Cited

U.S. PATENT DOCUMENTS

| | | | |
|---|---|---|---|
| 4,823,990 | A | 4/1989 | Roggenburg et al. |
| 5,171,132 | A | 12/1992 | Miyazaki et al. |
| 5,277,556 | A | 1/1994 | van Lintel |
| 5,288,214 | A | 2/1994 | Fukuda et al. |
| 5,529,465 | A | 6/1996 | Zengerle et al. |
| 5,839,467 | A | 11/1998 | Saaski et al. |
| 5,863,801 | A | 1/1999 | Southgate et al. |
| 5,962,081 | A | 10/1999 | Ohman et al. |
| 5,976,336 | A | 11/1999 | Dubrow et al. |
| 6,136,212 | A | 10/2000 | Mastraangelo et al. |
| 6,210,986 | B1 | 4/2001 | Arnold et al. |
| 6,227,824 | B1 | 5/2001 | Stehr |
| 6,261,066 | B1 | 7/2001 | Linnemann et al. |
| 6,306,273 | B1 | 10/2001 | Wainright et al. |
| 6,318,970 | B1 | 11/2001 | Backhouse |
| 6,406,605 | B1 | 6/2002 | Moles |
| 6,408,878 | B2 | 6/2002 | Unger et al. |
| 6,413,401 | B1 | 7/2002 | Chow et al. |
| 6,431,212 | B1 | 8/2002 | Hayenga et al. |
| 6,527,003 | B1 | 3/2003 | Webster |
| 6,554,591 | B1 | 4/2003 | Dai et al. |
| 6,644,944 | B2 | 11/2003 | Karp |
| 6,725,882 | B1 | 4/2004 | Shia et al. |
| 6,739,576 | B2 | 5/2004 | O'Connor et al. |
| 6,749,407 | B2 | 6/2004 | Xie et al. |
| 6,767,194 | B2 | 7/2004 | Jeon et al. |
| 6,843,262 | B2 | 1/2005 | Ismagilov et al. |
| 6,921,253 | B2 | 7/2005 | Shuler et al. |
| 6,953,058 | B2 | 10/2005 | Fernandes et al. |
| 7,090,471 | B2 | 8/2006 | Xie et al. |
| 7,111,635 | B2 | 9/2006 | Beebe et al. |
| 9,358,539 | B2 | 6/2016 | Abate et al. |
| 2002/0168278 | A1 | 11/2002 | Li et al. |
| 2002/0187560 | A1 | 12/2002 | Pezzuto et al. |
| 2003/0015244 | A1 | 1/2003 | Ismagilov et al. |
| 2003/0075445 | A1 | 4/2003 | Woudenberg et al. |
| 2003/0116738 | A1 | 6/2003 | O'Connor et al. |
| 2004/0228734 | A1 | 11/2004 | Jeon et al. |
| 2005/0037471 | A1 | 2/2005 | Liu et al. |
| 2005/0106066 | A1 | 5/2005 | Saltsman et al. |
| 2006/0055722 | A1 | 3/2006 | Hirai et al. |
| 2006/0073035 | A1 | 4/2006 | Sundararajan |
| 2006/0165372 | A1 | 6/2006 | Lee et al. |
| 2007/0000548 | A1 | 1/2007 | Lee et al. |
| 2007/0044851 | A1 | 3/2007 | Gilbert et al. |
| 2007/0086926 | A1 | 4/2007 | Andersson et al. |

FOREIGN PATENT DOCUMENTS

| | | |
|---|---|---|
| CN | 1580756 A | 2/2005 |
| CN | 1749008 A | 3/2006 |
| CN | 1968737 A | 5/2007 |
| CN | 101687152 A | 3/2010 |
| CN | 101687416 A | 3/2010 |
| CN | 101765502 A | 6/2010 |
| CN | 102059162 A | 5/2011 |
| CN | 102124259 B | 12/2015 |
| DE | 199 49 551 A1 | 10/1999 |
| DE | 103 15 514 B3 | 9/2004 |
| EP | 0 706 004 A2 | 4/1996 |
| GB | 2 392 397 A | 3/2004 |
| WO | WO 97/01055 A1 | 1/1997 |
| WO | WO 98/00707 A1 | 1/1998 |
| WO | WO 00/22436 A1 | 4/2000 |
| WO | WO 00/62931 A1 | 10/2000 |
| WO | WO 01/01025 A3 | 1/2001 |
| WO | WO 02/068823 A1 | 9/2002 |
| WO | WO 06/060748 A | 6/2006 |
| WO | WO 08/071351 A | 6/2008 |

OTHER PUBLICATIONS

Thorsen, Todd et al. "Dynamic pattern formation in a vesicle-generating microfluidic device." Physical Review Letters (2001) 86 4163-4166. (Year: 2001).*
Xu, Shengqing et al. "Generation of monodisperse particles by using microfluidics: control over size, shape, and composition." Angewandte Chemie Int'l. Ed. (2005) 117 734-738. (Year: 2005).*
Chinese Office Action for CN 200980127958.4 dated Aug. 3, 2012.
Chinese Office Action dated May 22, 2013 for Application No. CN 200980127958.4.
Chinese Office Action dated Nov. 15, 2013 for Application No. CN 200980127958.4.
Chinese Office Action dated May 9, 2014 for Application No. 200980127958.4.
Chinese Office Action dated Oct. 23, 2014 for Application No. 200980127958.4.
Chinese Office Action dated May 5, 2015 for Application No. 200980127958.4.
Chinese Office Action dated Nov. 14, 2016 for Application No. 201510789042.2.
Extended European Search Report for Application No. EP 15175651.7 dated Mar. 3, 2016.
International Search Report and Written Opinion from International Application No. PCT/US2009/003024 dated Jan. 20, 2010.
International Search Report, from corresponding International Application No. PCT/US02/00293, dated Sep. 4, 2002.
Abate et al., Single-layer membrane valves for elastomeric microfluidic devices, Applied Physics Letters, vol. 92, pp. 243509 (2008).
Dendukuri et al., Stop-flow lithography in a microfluidic device. Lab Chip. Jul. 2007;7(7):818-28. Epub May 21, 2007.
Epstein, Can Droplets and Bubbles Think?, Science, vol. 315, pp. 775 (2007).
Fuerstman et al., Coding/Decoding and Reversibility of Droplet Trains in Microfluidic Networks, Science, vol. 315, pp. 828 (2007).

(56) References Cited

OTHER PUBLICATIONS

Hosokawa et al., A pneumatically-actuated three-way microvalve fabricated with polydimethylsiloxane using the membrane transfer technique. J Micromech Microeng. 2000; 10: 415-420.

Hsiung et al., Active micro-mixers utilizing moving wall structures activated pneumatically by buried side chambers. Micromech Microeng. 2007;17:129-38.

Jeon et al., Design and fabrication of integrated passive valves and pumps for flexible polymer 3D microfluidic systems, Biomedical Microdevices, vol. 4, pp. 117-121 (2002).

Lee et al., A tunable microflow focusing device utilizing controllable moving walls and its applications for formation of microdroplets in liquids, J. Micromech. Microeng., vol. 17, pp. 1121-1129 (2007).

Lee et al., Characterization of laterally deformable elastomer membranes for microfluidics, J. Micromech. Microeng., vol. 17, pp. 843-851 (2007).

Maltezos, et al., Replication of three-dimensional valves from printed wax molds, Sensors and Actuators, vol. 135, pp. 620-624 (2007).

Niu, X., Electrorheological-fluid-based microvalves, Applied Physics Letters, vol. 87, pp. 243501 (2005).

Prakash et al., Microfluidic Bubble Logic, Science, vol. 315, pp. 832 (2007).

Prins et al., Fluid Control in Multichannel Structures by Electrocapillary Pressure, Science, vol. 291, pp. 277 (2001).

Terray et al., Microfluidic Control Using Collodial Devices, Science, vol. 296, pp. 1841 (2002).

Unger et al, Monolithic Microfabricated Valves and Pumps by Multilayer Soft Lithography, Science, vol. 288, pp. 113-116 (2000).

Wang et al., Pneumatically driven peristalitic micropumps utilitizng serpentine-shape channels, J. Micromech. Microeng., vol. 16, pp. 341-348 (2006).

Yang et al., Mirrorless Lasing from Mesostructured Waveguides Patterned by Soft Lithography, Science, vol. 287, pp. 465 (2000).

Zhao, et al., Surface-Directed Liquid Flow Inside Microchannels, Science, vol. 291, pp. 1023 (2001).

Chinese Office Action for Application No. CN 201510789042.2 dated Jul. 11, 2017.

\* cited by examiner

VALVES AND OTHER FLOW CONTROL IN FLUIDIC SYSTEMS INCLUDING MICROFLUIDIC SYSTEMS

RELATED APPLICATIONS

This application is a continuation of U.S. patent application Ser. No. 12/992,376, filed Mar. 7, 2011, entitled "Valves and Other Flow Control in Fluidic Systems Including Microfluidic Systems," which is a national stage filing of Int. Patent Application Serial No. PCT/US2009/003024, filed May 15, 2009 which claims the benefit of the priority of U.S. Provisional Application Ser. No. 61/053,812, filed May 16, 2008, the content of each of which is incorporated herein by reference.

GOVERNMENT FUNDING

This invention was made with government support under Grant Nos. DMR-0602684, DBI-0649865 and DMR-0213805. The government has certain rights in the invention.

FIELD OF INVENTION

The present invention relates generally to articles and methods for controlling flow in fluidic systems, especially in microfluidic systems.

BACKGROUND

Fluidic systems, including microfluidic systems, have found application in a variety of fields. These systems that typically involve controlled fluid flow through one or more microfluidic channels can provide unique platforms useful in both research and production. For instance, one class of systems can be used for analyzing very small amounts of samples and reagents on chemical devices or "chips" that include very small fluid channels and small reaction/analysis chambers. Microfluidic systems are currently being developed for genetic analysis, clinical diagnostics, drug screening, and environmental monitoring. These systems can handle liquid or gas samples on a small scale, and are generally compatible with chip-based substrates. The behavior of fluid flow in these small-scale systems, therefore, is central to their development.

Methods for controlling fluid flow, for instance, delivering fluids and varying the flow rate of fluids, are an important aspect of microfluidics. These methods, however, typically require substantial capital equipment that can be expensive, bulky, and/or complicated to fabricate. Advances in the field that could, for example, reduce costs, reduce size and/or reduce the complexity of fabrication would find application in a number of different fields.

SUMMARY OF THE INVENTION

The present invention relates generally to articles and methods for controlling flow in fluidic systems, especially in microfluidic systems. The subject matter of the present invention involves, in some cases, interrelated products, alternative solutions to a particular problem, and/or a plurality of different uses of one or more systems and/or articles.

In one embodiment, a microfluidic system is provided. The microfluidic system includes a delivery channel comprising an upstream portion and a downstream portion, and a first channel section and a second channel section downstream of and fluidly connected to the delivery channel at a junction, the second channel section having a higher hydrodynamic resistance than the first channel section. The microfluidic system also includes a valve comprising a control channel adjacent the first channel section and not fluidly connected to the first channel section and a membrane positioned between the first channel section and the control channel. The control channel is constructed and arranged to cause deflection of the membrane, resulting in constriction of at least a portion of the first channel section. At least a portion of the control channel may be on the same horizontal plane as the first channel section.

In another embodiment, a microfluidic system includes a delivery channel having an upstream portion and a downstream portion, and a first channel section and a second channel section downstream of and fluidly connected to the delivery channel at a junction. The microfluidic system also includes a valve, downstream of the junction, associated with the first channel section, able to vary hydrodynamic resistance in the first channel section. The second channel section does not include a valve able to vary its hydrodynamic resistance. The microfluidic system is constructed and arranged such that actuation of the valve adjusts hydrodynamic resistance of the first channel section, and results in variation in the relative amounts of fluid flow through the first channel section and the second channel section.

In another embodiment, a method is provided. The method includes providing a microfluidic system comprising a delivery channel, a first channel section and a second channel section downstream of and fluidly connected to the delivery channel at a junction, the second channel section having a higher hydrodynamic resistance than the first channel section, wherein the microfluidic system further comprises a valve constructed and arranged to restrict fluid flow in the first channel section. The method also includes flowing a fluid comprising a plurality of components in the first channel section but not the second channel section without the need to change a cross-sectional dimension of the first or second channel sections. The method involves actuating the valve, thereby causing constriction of a portion of the first channel section, and causing a plurality of components to flow in the second channel section but not the first channel section during actuation of the valve.

In another embodiment, a method comprises producing in the microfluidic system a series of single, substantially uniform droplets having a first volume and comprising a subject fluid, the droplets being surrounded by a continuous fluid (e.g., a liquid). This droplet production is performed without the need to change a cross-sectional dimension of a channel of a microfluidic system during use. The method also includes changing a cross-sectional dimension of a channel of the microfluidic system so as to produce droplets comprising the subject fluid having a second volume different from the first volume.

In another embodiment, a method comprises producing in the microfluidic system a series of single, substantially uniform droplets comprising a subject fluid at a first frequency, the droplets being surrounded by a continuous fluid (e.g., a liquid). This droplet production is performed without the need to change a cross-sectional dimension of a channel of a microfluidic system during use. The method also includes changing a cross-sectional dimension of a channel of the microfluidic system so as to produce droplets comprising the subject fluid at a second frequency different from the first frequency. The droplets formed at the first frequency may have the same or a different volume as the droplets formed at the second frequency. Substantially constant flow rates of the subject fluid and/or continuous fluid may be applied during production of the droplets.

In another embodiment, a method comprises flowing a subject fluid in a subject fluid channel of a microfluidic system and flowing a continuous fluid in one or more continuous fluid channels of the microfluidic system. The method also includes surrounding at least a portion of the subject fluid by the continuous fluid at an interconnected region where the subject fluid channel and the one or more continuous fluid channels meet, and flowing the continuous fluid in a main channel downstream of the interconnected region. Without the need to change a cross-sectional dimension of the subject fluid channel, the one or more continuous fluid channels, or the main channel, a first droplet comprising the subject fluid can be formed within the continuous fluid, the first droplet having a first volume. The method also includes changing a cross-sectional dimension of a channel portion at or adjacent the interconnected region, and forming a second droplet comprising the subject fluid, the second droplet having a second volume different from the first volume.

In another embodiment, a microfluidic device comprises a subject fluid channel, one or more continuous fluid channels, and an interconnected region where the subject fluid channel and the one or more continuous fluid channels meet, wherein the subject fluid channel, the one or more continuous fluid channels, and the interconnected region are constructed and arranged so as to have the ability to form a droplet of subject fluid provided by the subject fluid channel within continuous fluid provided by the one or more continuous fluid channels without the need to change a cross-sectional dimension of the subject fluid channel, the one or more continuous fluid channels, or the interconnected region. The microfluidic device also includes a main channel adjacent and downstream of the interconnected region, and one or more valves constructed and arranged to change a cross-sectional dimension of the subject fluid channel, the one of more continuous fluid channels, the interconnected region, and/or the main channel, whereby droplets of subject fluid of varying size can be produced based on the position of the one or more valves.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
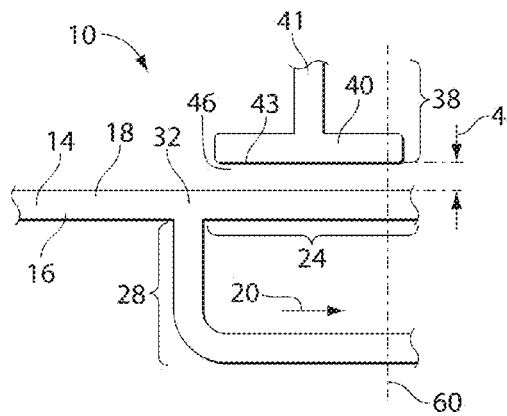
FIGS. 1A-1D show top views of microfluidic systems that include a valve which can be used control fluid flow according to certain embodiments of the invention.

The present invention relates generally to articles and methods for controlling flow in fluidic systems, especially in microfluidic systems. In one aspect, a microfluidic system described herein includes a configuration such that the actuation of a single valve can allow the switching of fluids from a first fluid path (e.g., a first channel section) to a second fluid path (e.g., a second channel section). This may be achieved, for example, by incorporating a valve with a first channel section, which may have a lower hydrodynamic resistance than a second channel section prior to actuation of the valve. Actuation of the valve can cause only the hydrodynamic resistance of the first channel section to increase, thereby redirecting fluid flow into the second channel section (which now has a relatively lower hydrodynamic resistance). In some embodiments, the valve comprises a control channel for introducing a positive or reduced pressure, and is adapted to modulate fluid flow in an adjacent channel section by constricting or expanding the channel section. For example, the valve and/or the channel section may be formed in a flexible material and actuation of the valve may be achieved by applying a positive or reduced pressure to the valve to cause deformation of both the valve and the channel section.

Advantageously, the valves described herein may afford continuous, fast response times and control of flow rate, making them suitable for applications such as microfluidic sorting and droplet synchronization. Moreover, in certain embodiments where the channels and valve(s) exist in a single plane, they can be made in a single stamp using standard single-layer soft-lithography. This combines the precision control afforded by the valves described herein with the simple fabrication of stamped single-layer PDMS devices.

Another aspect of the invention includes articles and methods associated with manipulation of multiphase materials (e.g., dispersions). For instance, one or more valves may be combined with a flow focusing system so as to form droplets of different volumes and/or frequencies without the need to vary flow rates of the fluids when they are introduced into the fluidic system. Examples of such systems are described in more detail below.

In one aspect of the invention, systems and methods of controlling fluid flow are provided. FIGS. 1A-1D show an example of one such system according to an embodiment of the invention. As shown in the embodiment illustrated in FIG. 1A, microfluidic system 10 includes a delivery channel 14 including an upstream portion 16 and a downstream portion 18, as fluid flows generally in the direction of arrow 20. The microfluidic system also includes a first channel section 24 and a second channel section 28 (e.g., a bypass channel that bypasses flow in the first channel section) downstream of and fluidly connected to the delivery channel at a junction 32. In some cases, the first and second channel sections have different hydrodynamic resistances (resistance to fluid flow). The hydrodynamic resistances of a first and a second channel section may be different prior to and/or independently of any actuation of a component (e.g., a valve) of the system and/or without the need to change a cross-section of the first or second channel sections. For example, as shown in this illustrative embodiment, first channel section 24 has a relatively lower resistance to fluid flow than second channel section 28 due to the relatively longer channel length of second channel section 28. It should be understood, however, that the microfluidic system may have other designs and/or configurations for imparting different relative resistances to fluid flow, and such designs and configurations can be determined by those of ordinary skill in the art. For instance, in some embodiments, the length, width, height, and/or shape of the fluid path can be designed to cause one channel section to have a resistance to fluid flow different from another channel section. In other embodiments, at least a portion of a channel section may include an obstruction such as a semi-permeable plug (e.g., a hydrogel), a membrane, or another structure that can impart and/or change resistance to fluid flow through that section.

Microfluidic system 10 also includes a valve 38 associated with the first channel section and positioned downstream of junction 32. The valve, which is adjacent the first channel section, may be constructed and arranged to restrict or increase fluid flow in the first channel section, and thereby able to vary hydrodynamic resistance in the first channel section. Although any suitable valve can be used in the microfluidic system, in one embodiment the valve comprises a control channel 40 adjacent first channel section 24 and not fluidly connected to the first channel section. The control channel may include, for example, a microfluidic channel that can be actuated by applying a positive pressure or a reduced pressure (e.g., a vacuum) to an inlet 41 of the control channel. In some embodiments, the control channel does not include an outlet and application of pressure causes the control channel to expand or contract. In other embodiments, however, the control channel may include an outlet.

Figure 1B:
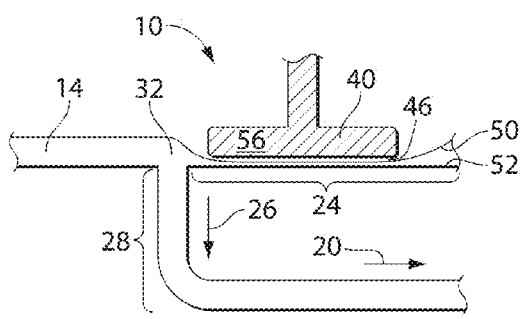
Figure 1C:
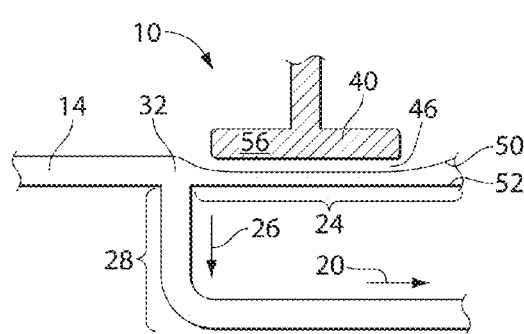

As shown in the illustrative embodiment of FIG. 1A, a membrane 46 may be positioned between the first channel section and the control channel. The control channel (or any other suitable valve) may be constructed and arranged to cause deflection of the membrane (e.g., upon expansion or contraction of the control channel), resulting in the constriction or expansion of at least a portion of the first channel section. For example, as shown in the embodiment illustrated in FIG. 1B, valve 38 may be actuated by applying a positive pressure to inlet 41 of the control channel to cause deflection of membrane 46. This actuation may cause a substantially complete restriction of fluid flow in first channel section 24 as shown in FIG. 1B, or a partial fluid restriction in the first channel section as shown in FIG. 1C. When a substantially complete restriction of fluid flow occurs, the valve may constrict an entire cross-section of the channel portion so that substantially no fluid can flow past the constricted portion. When a partial restriction of fluid flow occurs, the valve may constrict a part but not all of the channel portion such that a cross-sectional area of the channel portion is reduced by, for example, at least about 10%, 20%, 30%, 40%, 50%, 60%, 70%, 80%, or 90%.

As illustrated in FIG. 1B, substantially complete restriction of fluid flow in the first channel section may involve actuation of the valve such that a first surface 50 and a second, opposing surface 52 of the first channel section are in substantial physical contact upon actuation of the valve. This physical contact can cause the first channel section to close, resulting in fluid predominately flowing in the direction of arrow 26 in second channel section 28. Where surfaces 50 and 52 are not in substantial physical contact, as shown in FIG. 1C, fluid can continue to flow in the first channel section but the quantity of fluid and/or volumetric flow rate of the fluid flowing in the first channel section may be reduced.

Figure 1D:
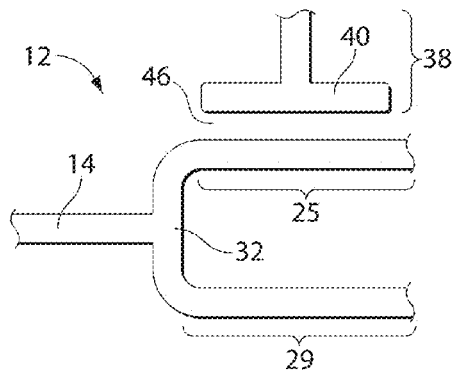

As shown in FIGS. 1A-1C, second channel section 28 has a higher hydrodynamic resistance than first channel section 24 prior to actuation of the valve, since channel section 28 has a relatively longer length than the first channel section. As shown in FIG. 1D, however, in some cases first channel section 25 and second channel section 29 have the same or substantially similar resistances to fluid flow prior to actuation of a valve. In other embodiments, first channel section 24 has a higher hydrodynamic resistance than second channel section 28.

Furthermore, although FIGS. 1A-1D show a single valve constructed and arranged to modify fluid flow in a first channel section, a channel section may have more than one valve associated therewith in some embodiments. A valve may also be optionally associated with a second channel section in some cases.

As mentioned above, valve 38 may be actuated by increasing the pressure in control channel 40. For example, a fluid 56 such as a liquid or air can be introduced into the control channel which may cause expansion of all or portion of the control channel. Valve 38 may also be actuated by applying a reduce pressure (e.g., a vacuum) to the control channel which may cause all or a portion of the control channel to contract. In some such embodiments, all or portions of the control channel may be formed in a flexible (e.g., elastomeric) material. For example, in one embodiment, the control channel is formed from a mold made in a flexible material. In some cases, surface 43 of the control channel is flexible to allow expansion and/or contraction of that portion of the control channel. An example of a flexible material is a silicone (e.g., polydimethylsiloxane), as described in more detail below.

Figure 1E:
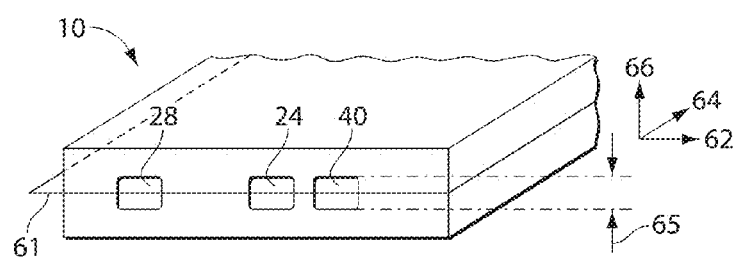
FIG. 1E shows a cross-sectional view of the channel system shown in FIGS. 1A-1C according to one embodiment of the invention.

In some embodiments, all or a portion of control channel 40 (or other suitable valve) is positioned on the same horizontal plane as first channel section 24. FIG. 1E shows a cross section (cross section 60 of FIG. 1A) of microfluidic system 10 according to one embodiment. As illustrated, a horizontal plane 61 formed by the area between arrows 62 and 64 intersect at least a portion of first channel section 24 and at least a portion of control channel 40. In some such embodiments, the microfluidic system is configured such that a vertical plane defined by the area between arrows 64 and 66 does not intersect both a channel section and a control channel. That is, at least a portion of a control channel is not positioned above or below the channel section. In certain embodiments, a control channel (or other suitable valve) and a first channel section are positioned on the same horizontal plane in a single layer to form a "planar valve", as used herein. For example, as shown in the embodiment illustrated in FIG. 1E, the heights of the control channel and first channel section are the same and the channels are formed in a single layer 65. Additionally, in some cases, all of the channels of the microfluidic system are positioned on the same horizontal plane (e.g., in a single layer). Formation of a microfluidic system including channels on a single layer can be advantageous because it may reduce the complexity of the fabrication, as described herein.

In other embodiments, a control channel and/or a channel section to be constricted or expanded may formed in more than one layer. For instance, the control channel and/or channel section may include certain features that are present at a first layer and not at a second layer and/or features that are present at the second layer and not at a first layer. One example of a device that is formed in more than one layer is a device including a channel having varying heights, since such a device includes features positioned at more than one horizontal plane.

To provide or cause fluid flow in microfluidic system 10, a substantially constant or varying pressure source (e.g., a syringe pump) may be fluidly connected to an upstream portion of delivery channel 14. Additionally or alternatively, a source of vacuum may be connected to a downstream portion of the microfluidic system. When a substantially constant pressure source (or a vacuum) is fluidly connected to the microfluidic system, actuation of valve 38 can adjust hydrodynamic resistance of the first channel section, and can result in variation of the relative amounts fluid flow through the first and second channel sections. For example, prior to actuation of the valve, a first amount of fluid may be flowing in the first channel section and a second amount of fluid may be flowing in the second channel section. Upon actuation of the valve causing substantially complete constriction of the first channel section as shown in FIG. 1B, the amount of fluid flowing in the second channel section may now be the sum of the first and second amounts of fluid. That is, the reduction of fluid flowing in the first channel section causes an increase of the amount of fluid flowing in the second channel section.

In some cases, a substantially constant volume source (e.g., compressed air) is fluidly connected to an upstream portion of the delivery channel. In some embodiments, a substantially constant volume source fluidly connected to the microfluidic system may result in the change of hydrodynamic resistance in the first channel section upon actuation of the valve, but does not result in variation in the amount of fluid flow or volumetric flow rate through the second channel section. For example, a first amount of fluid may be flowing in the first channel section and a second amount of fluid may be flowing in the second channel section prior to actuation of a valve. Upon actuation of a valve as shown in FIG. 1B causing substantially complete constriction of the first channel section, the fluid flow in the first channel section may be reduced, but the second amount of fluid flowing in the second channel section may remain substantially constant.

Figure 2A:
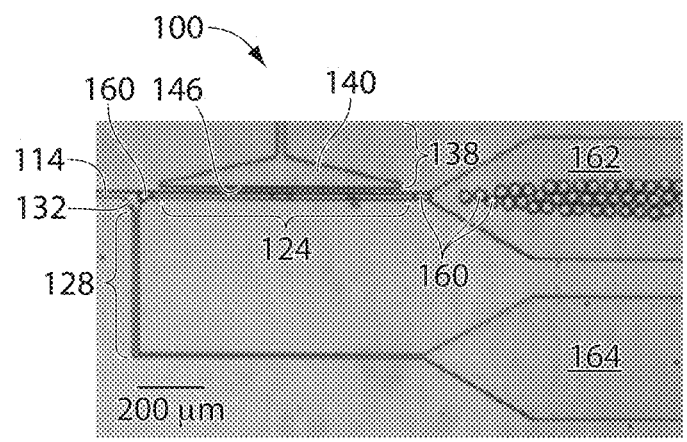
FIGS. 2A-2B show photographs of a microfluidic system including a planar valve constructed and arranged to modify a cross-sectional area of a channel section according to one embodiment of the invention.
Figure 2B:
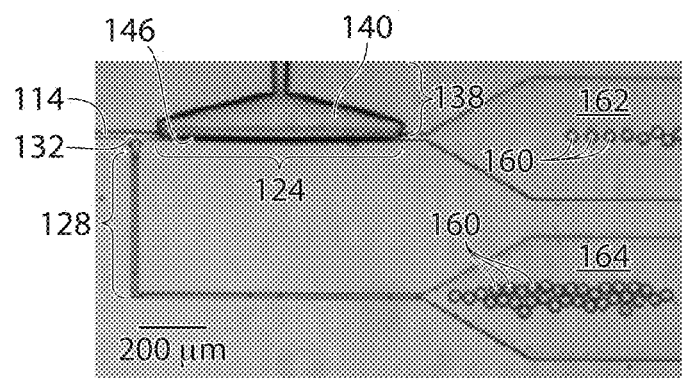

FIGS. 2A and 2B show an example of a microfluidic system including a planar valve that can vary the relative amounts of fluid flow through first and second channel sections of the microfluidic system. Such a system may be used, for example, to sort droplets or other components (e.g., beads, cells, and other reactive or non-reactive components) into different reservoirs. As shown in the embodiment illustrated in FIG. 2A, microfluidic system 100 includes a delivery channel 114, a first channel section 124 and a second channel section 128. The first and second channel sections are downstream of an intersection 132 where the first and second channel sections meet. Valve 138 is positioned on the same horizontal plane as the first and second channel sections, and includes a control channel 140 that is not fluidly connected to the first channel section, but is separated from the first channel section by membrane 146. Prior to actuation of the valve, a plurality of droplets 160 are flowed into delivery channel 114 (FIG. 2A). Because first channel section 124 has a lower resistance to fluid flow than second channel section 128, the droplets flow into the first channel section and not the second channel section. In other words, because of the configuration of the channel system, a plurality of droplets (or other components) can be flowed into the first channel section and not the second channel section without the need to change a cross-section of the first or second channel sections. This causes the positioning of the plurality of droplets into reservoir 162 downstream of the first channel section. Even though the droplets do not flow into the second channel section, the fluid in which the droplets are dispersed (e.g., a continuous fluid, which may be a liquid or a gas, for example) may continue to flow through both the first and second channel sections.

As shown in the embodiment illustrated in FIG. 2B, actuation of valve 138 may be achieved by increasing the pressure in control channel 140. This can cause, in some embodiments, the expansion of the control channel and can result in the deflection of membrane 146. The deflection of the membrane can cause constriction of first channel portion 124, thereby increasing the hydrodynamic resistance of the first channel section and reducing the amount of fluid flow therethrough. As shown in the embodiment illustrated in FIG. 2B, the increase in hydrodynamic resistance of the first channel section can cause the droplets to flow through second channel section 128, which now has a relatively lower hydrodynamic resistance compared to that of the first channel section. This can result in the positioning of droplets 160 in reservoir 164 downstream of the second channel section. FIG. 2B also shows residual droplets 160 positioned in reservoir 162, these droplets being positioned when the valve was configured as illustrated in FIG. 2A.

In some embodiments, the valve can alternate between being actuated and non-actuated such that portions of the droplets (or other components) flow into the first channel section and other portions of the droplets flow into the second channel section. This can allow, for example, droplets or other components of a first type to be flowed in the first channel section and droplets or components of a second type to flow into the second channel section. In certain embodiments, the sorting of droplets or other fluid components is facilitated by a characteristic of the droplet or component. For example, droplets or components of a certain size may readily flow through a channel section having a certain hydrodynamic resistance. Upon reduction of the hydrodynamic resistance in a first channel section, droplets or components having a relatively small size may still continue to flow in the constricted channel section, but droplets or components of a larger size may prefer to flow in a different channel section. The threshold of droplet or component size may be altered by varying the degree of actuation of a valve associated with one of the channel sections.

As shown in certain embodiments described herein, a microfluidic system may include a valve associated with a first channel section (and able to vary hydrodynamic resistance in the first channel section), but a valve is not associated with a second channel section (so that hydrodynamic resistance in the second channel section cannot be varied during use). In some such embodiments, the amount of fluid, the volumetric flow rate, and/or the direction of fluid flow can be controlled by the use of a single valve associated with the first channel section. For example, the channel sections and/or other portions of the microfluidic system may be configured such that fluid (and/or components of the fluid) flow predominately in one of the channel sections prior to actuation of a valve. Upon actuation of a valve associated with one of the channel sections, fluid flow may increase or decrease in the first or second channel sections. In some cases, the hydrodynamic resistance of one channel section can be increased or decreased relative to the other channel section upon actuation of a valve. This can cause fluid and/or components of a fluid to switch fluid paths. Switching may be useful for applications where the control of the amount of fluid flow, the volumetric flow rate and/or positioning of components is important. In other embodiments, each of a first channel section and a second channel section has a valve associated therewith. In yet other embodiments, more than one valve may be associated with a single channel section.

In some embodiments, valves (including control channels) and other channels of a microfluidic system are positioned on the same plane in a single layer. Such and other valves may have a fast response time and can be used to control flow rate (e.g., continuously). To characterize this control, the pressure drop and flow rate along channel sections can be measured as a function of valve actuation pressure. The methods described herein can also be used to monitor valve performance and to study the effects of different channel configurations on valve performance.

As shown in the embodiments illustrated in FIGS. 3A-3E, valve performance may be determined using a differential manometer that measures pressure drop across a channel section. Differential manometers are described in more detail in International Patent Application No. PCT/US06/029442, entitled "Pressure Determination In Microfluidic Systems", filed Jul. 27, 2006 by Abkarian et al., and U.S. patent application Ser. No. 11/989,344, entitled "Pressure Determination In Microfluidic Systems", filed Jan. 24, 2008 by Abkarian et al., which are incorporated herein by reference in their entirety.

Figure 3A:
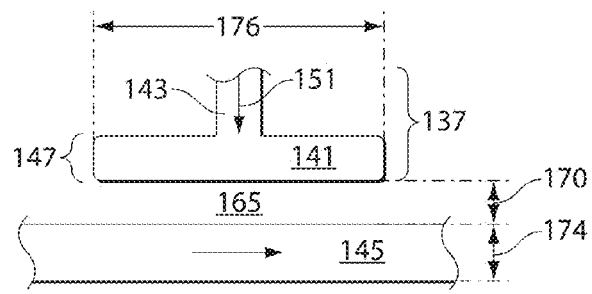
FIGS. 3A-3E show a fluid manometer that can be used to measure fluid flow in a microfluidic system according to one embodiment of the invention.
Figure 3B:
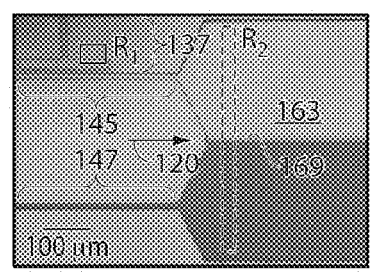

FIG. 3A shows a configuration of a microfluidic system including a valve 137 comprising a control channel 141 configured and arranged to constrict channel section 145. As shown in FIG. 3B, channel section 145 is fluidly connected to channel section 147 (which does not have a valve associated therewith). Channel sections 145 and 147 are fluidly connected to reservoir 163 to form a differential manometer. Two different color solutions may be flowed into the channel sections in the direction of arrow 120. The channel sections are calibrated such that an interface 169 is created equidistance to the outlets of the channel sections. As shown in the embodiment illustrated in FIG. 3C, actuation of valve 137 results in the decrease in fluid flow in channel section 145 and an increase in fluid flow in channel section 147. This increase in fluid flow in channel section 147 results in the shifting of interface 169. As shown in the embodiment illustrated in FIG. 3D, the increase in volume of the control channel of valve 137 results in displacement of a wall of the control channel. This displacement within box $R_1$ is measured as a function of actuation pressure. As shown in the embodiment illustrated in FIG. 3E, actuation of the valve results in the repositioning of interface 169 which can be measured as the function of change in pressure. This change in position of the interface may be measured within box $R_2$.

The components of fluidic systems described herein may have various configurations which may be chosen depending on the desired performance characteristics. For example, as shown in the embodiment illustrated in FIG. 3A, a microfluidic system may include a valve 137 comprising a control channel 141 having an inlet 143. The introduction of a fluid in the direction of arrow 151 can cause the control channel to deflect and/or deform a membrane 165 which separates the control channel from a channel section 145. The control channel, as shown in this exemplary embodiment, has a length 176 and a width 147.

Figure 4A:
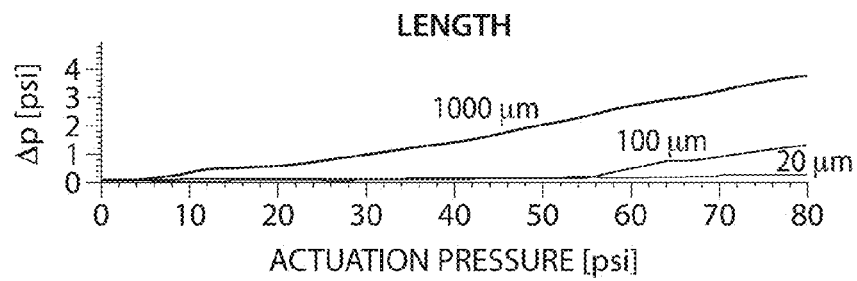
FIGS. 4A-4D show the effect of various configurations of a microfluidic system on the performance of a planar valve according to embodiments of the invention.

Generally, a longer control channel may be used to constrict or expand greater portions of a channel section and, in some embodiments, may allow greater control of fluid flow through the channel section. For example, FIG. 4A shows the pressure drop across channel section 145 as a function of pressure used to actuate control channel 141, according to one embodiment of the invention. The channels were formed by molding PDMS. As shown in this exemplary embodiment, a control channel having a longer length may result in a greater pressure drop across the channel section when the control channel is actuated to constrict the channel section.

A control channel may have a length of greater than or equal to about 10 microns, greater than or equal to about 50 microns, greater than or equal to about 100 microns, greater than or equal to about 250 microns, greater than or equal to about 500 microns, greater than or equal to about 1 millimeter, greater than or equal to about 2 millimeters, greater than or equal to about 5 millimeters, or greater than or equal to about 1 centimeter. The length of the control channel may be less than about 5 cm, for example. In some embodiments, the length of the control channel is the same as or less than the length of channel section in which the control channel modulates. The control channel may be substantially parallel to the channel section in which it modulates, or there may be varying distances between portions of the controlled channel and portions of the channel section.

The width of the control channel can also vary. A greater width of the control channel may allow the control channel to have a higher pressure which can facilitate actuation in some cases. The width of a control channel may be, for example, greater than or equal to about 10 microns, greater than or equal to about 25 microns, greater than or equal to about 50 microns, greater than or equal to about 100 microns, greater than or equal to about 250 microns, or greater than or equal to about 500 microns. In some instances, the width of the control channel is less than about 2 cm. The width of the control channel may be less than the length of the control channel.

Figure 4B:
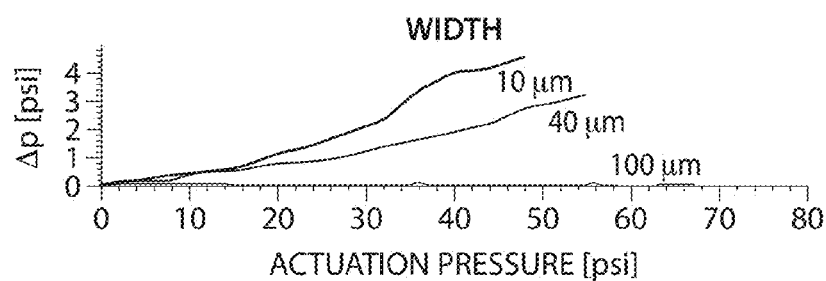

The width of a channel section to be deformed by a valve may also influence the operation of the valve. For example, as shown in the embodiment illustrated in FIG. 4B, a channel section having a smaller channel width may result in a larger pressure drop across the channel section as a function of the pressure used to actuate a valve associated with the channel section. A smaller width of the channel section may be easier to deform upon actuation of a valve since there is less area to deform.

The width of a channel section may be, for example, greater than or equal to about 10 microns, greater than or equal to about 25 microns, greater than or equal to about 50 microns, greater than or equal to about 100 microns, greater than or equal to about 250 microns, or greater than or equal to about 500 microns. In some instances, the width of a channel section is less than about 2 cm. In order to facilitate constriction of a channel section, valves on opposite sides of a channel section may be used in some embodiments.

In some embodiments, the length of the channel section deformed by the control channel is dependant upon the length of the control channel. For example, the length of the channel section deformed by the control channel may be the same as the length of the control channel, in one embodiment. In other embodiments, the length of the channel section deformed by the control channel may be greater or less than the length of the control channel. The length of the channel section deformed may be, for example, greater than or equal to about 10 microns, greater than or equal to about 50 microns, greater than or equal to about 100 microns, greater than or equal to about 250 microns, greater than or equal to about 500 microns, greater than or equal to about 1 millimeter, greater than or equal to about 2 millimeters, greater than or equal to about 5 millimeters, or greater than or equal to about 1 centimeter. The length deformed may be less than about 5 cm, for example.

In some cases, the length of the channel section that is deformed may be, for example, at least 1 times, at least 2 times, at least 5 times, at least 10 times, at least 20 times, or at least 50 times the width of the channel section. In addition, the length of the control channel may be at least 1 times, at least 2 times, at least 5 times, at least 10 times, at least 20 times, or at least 50 times the width of the channel section associated to be constricted or expanded.

The ability of the control channel to cause deformation and/or deflection of membrane 165 may depend, in part on the width 170 of the membrane. Generally, a membrane having a smaller width may allow the application of less force and/or pressure to the control channel in order to deform the membrane. Accordingly, an average width of a membrane positioned between a control channel and a channel section may be, for example, less than or equal to about 500 microns, less than or equal to about 250 microns, less than or equal to about 100 microns, less than or equal to about 75 microns, less than or equal to about 50 microns, less than or equal to about 25 microns, less than or equal to about 15 microns, or less than or equal to about 10 microns. The width of the membrane may be greater than about 1 micron, for example. In some cases the membrane has an average width of about 10 microns to about 15 microns, from about 5 microns to about 25 microns, or from about 10 microns to 50 microns.

Figure 4C:
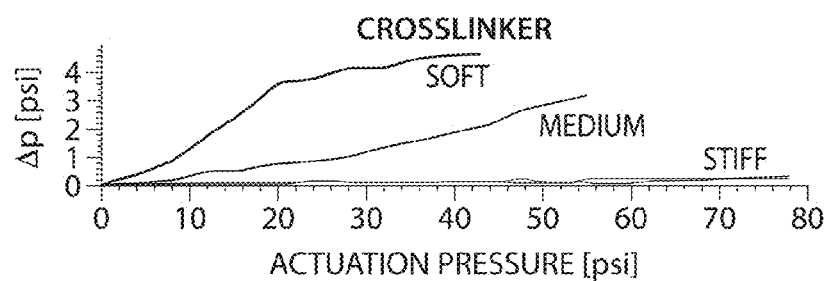

The elastic modulus (e.g., Young's modulus) of the membrane can also be varied in a microfluidic system by, for example, using different materials to form the membrane and/or different amounts of crosslinker, which can change the stiffness of the material. A membrane having less crosslinker may result in a relatively softer material and a higher elastic modulus. This higher elastic modulus may allow easier deformation of the membrane, and therefore less force and/or pressure can be applied to the membrane in order to cause deformation and/or deflection. For example, as shown in FIG. 4C, a membrane associated with a channel section having less crosslinker resulted in a softer material (since there was less crosslinking of the material). This resulted in a larger pressure drop across the channel section, as a function of the pressure used to actuate a valve associated with the channel section, compared to a membrane having larger amounts of crosslinker.

In some cases, the Young's modulus of a membrane is from about 250 kPa to about 4,000 kPa. In certain embodiments, the Young's modulus of the membrane is from about 500 kPa to about 3,000 kPa, or from about 1,000 kPa to about 3,000 kPa. The Young's modulus may be measured by, for example, applying a stress to a material and measuring the strain response, e.g., as described in more detail in X. Q. Brown, K. Ookawa, and J. Y. Wong, *Biomaterials* 26, 3123 (2005).

Figure 4D:
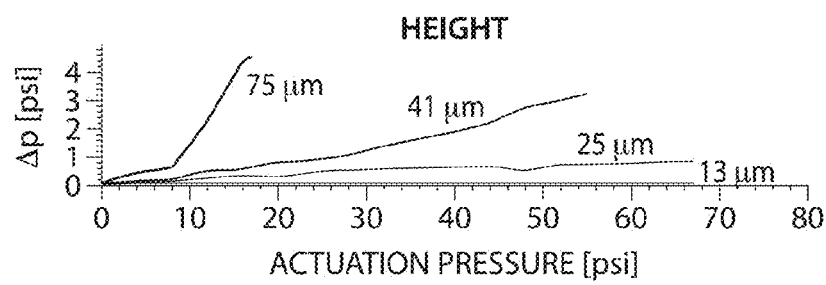

Another factor that may influence the operation of a valve is the aspect ratio (ratio of the height to the width) of the channel section(s) associated with the valve. In some such embodiments, a channel section having a larger aspect ratio can result in more complete closure of the channel section compared to a channel section having a relatively lower aspect ratio (e.g., while applying the same amount of force and/or pressure from a valve). For example, FIG. 4D shows the effect of increasing height of a channel section (the width being constant), resulting in a greater aspect ratio according to one embodiment of the invention. As illustrated in this figure, a greater height (and greater aspect ratio) may result in a larger pressure drop across a channel section as a function of the pressure used to actuate the valve associated with the channel section. The aspect ratio of a channel section may be, for example, at least about 1:1, at least about 2:1, at least about 3:1, at least about 5:1, at least about 10:1, or at least about 20:1. The aspect ratio of a channel section may be less than about 50:1, for example.

The height of a channel section may be, for example, greater than or equal to about 10 microns, greater than or equal to about 25 microns, greater than or equal to about 50 microns, greater than or equal to about 100 microns, greater than or equal to about 250 microns, or greater than or equal to about 500 microns. In some instances, the height of a channel section is less than about 2 cm.

Figures 5A, 5B:
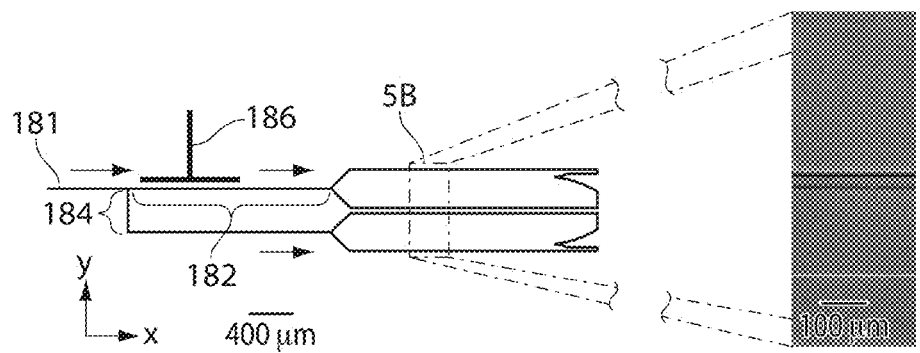
FIGS. 5A-5D show a device that can be used to quantify the range and precision of flow rate in channel sections that can be controlled by a valve according to one embodiment of the invention.
Figure 5C:
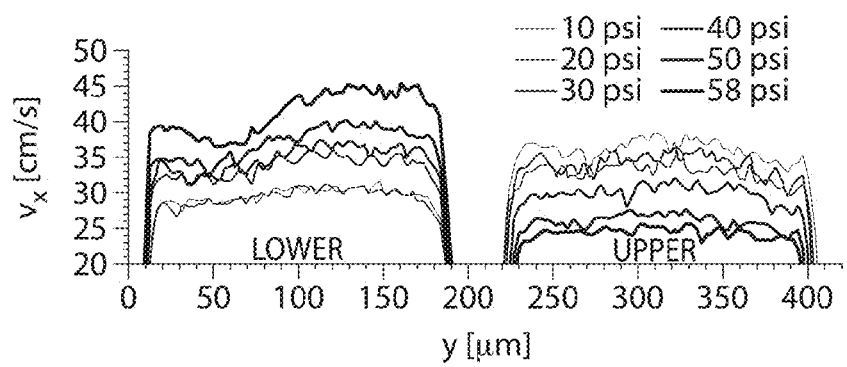
Figure 5D:
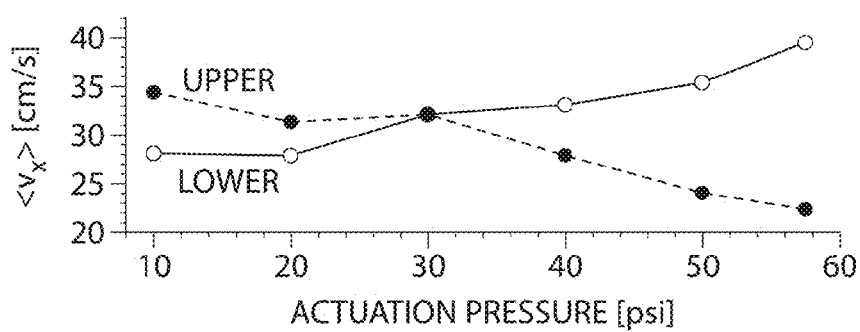

FIGS. 5A and 5B show a device that can be used to quantify the range and precision of flow rate in channel sections that can be controlled by a valve according to one embodiment of the invention. The microfluidic system shown in FIG. 5A includes a delivery channel 181 in fluid connection with channel section 182 and channel section 184. A valve 186 is constructed and arranged to constrict a portion of channel section 182. FIGS. 5B and 5D are the results of an experiment measuring relative flow rate in the channel sections, as described in more detail in the example section.

Advantageously, certain valves described herein may have fast response times (e.g., the time it takes a valve to constrict or expand a channel section and/or to reduce or increase flow rate, or achieve a steady flow rate, upon actuation of the valve). For example, a valve described herein may have a response time of, for example, less than or equal to about 1 second, less than or equal to about 0.1 second, less than or equal to about 0.01 second, less than or equal to about 5 milliseconds (msec), or less than or equal to about 1 msec.

Another aspect of the invention involves devices and techniques associated with manipulation of multiphase materials. Specifically, aspects of the invention involve the appreciation for a need for improvement in dispersion formation and/or dispersion control, and for applications of improved dispersions. Improvement in dispersion formation in accordance with the invention can find application in accurate delivery of, e.g., small fluid volumes (nanoliter, picoliter, and even femtoliter or smaller quantities) for a variety of uses. For example, one possible route for the systematic delivery of small fluid volumes is to form liquid droplets of controlled size, which may serve as convenient transporters of a specific chemical or may themselves be small chemical reactors. Since a droplet containing one picoliter of volume has a radius of under 10 microns, the controlled formation of very small droplets is very important. Specified volumes of more than one size can also be provided by articles and methods described herein, e.g., in order to precisely control the stoichiometry of different chemical reactants. For example, in a lab-on-a-chip device where delivery of reactants at specified quantities to various locations is required, this can be achieved by controlling the droplet size of a fluid reactant and then controlling its delivery route through the device. While to some degree control of droplet size and droplet size range in dispersions exists, the articles and methods described herein provide techniques for achieving better control of small fluid droplet size and/or improved techniques for achieving control. The articles and methods described herein provide the ability to easily and reproducibly control fluid droplet size and size range, and to divert fluid droplets of one size or size range to one location and droplets of another size or size range to another location, for example.

In one set of embodiments, the formation of droplets of a dispersed phase within a dispersant (e.g., a continuous phase) in a flow system (e.g., a microfluidic system) is provided. Advantageously, the size and/or the frequency of the droplets can be controlled in real-time using fluidic systems comprising valves so as to create controlled dispersions.

FIGS. 6A-6D show a method of performing droplets of various sizes according to one embodiment of the invention. As shown in these illustrative embodiments, microfluidic system 200 includes a continuous fluid channel 210 containing a continuous fluid 211 (e.g., a liquid or a gas) flowing in the direction of arrow 212. A subject fluid channel section 216 containing a subject fluid 218 (e.g., a liquid or a gas) flowing in the direction of arrow 220 is fluidly connected to the delivery channel at interconnected region 228. The continuous fluid and the subject fluid may be immiscible or slightly miscible in some embodiments. The formation of droplets 222 of the subject fluid is determined, at least in part, by the balance of the interfacial surface tension and the viscous shear forces of the continuous fluid. Droplets of the subject fluid can be pinched off of the subject fluid stream when these forces are balanced, and can be formed without the need to change a cross-sectional dimension of any of the channels. Other parameters being equal, the size of droplet 222 may be proportional to the width of interconnected region 228 and inversely proportional to the flow rate of continuous fluid 211.

The formation of droplets may also depend, in part, on the ratio of the flow rate of the subject fluid to the continuous fluid. Generally, a higher ratio of flow rate of the subject fluid to the continuous fluid can result in, for example, larger droplets, droplets being produced more quickly and/or jetting. The ratio of flow rate of the subject fluid to the continuous fluid may be, for example, less than 1:100 (e.g., 1:99), less than 1:80, less than 1:50, less than 1:40, less than 1:20, less than 1:10, less than 1:8, less than 1:5, less than 1:4, less than 1:3, or less than 1:1. The ratio of flow rates may, in turn, be dependent on the viscosities of the subject fluid and continuous fluid, the configuration of the channel system (e.g., whether there is one continuous channel or multiple continuous channels), and the dimensions of the channels.

Figure 6A:
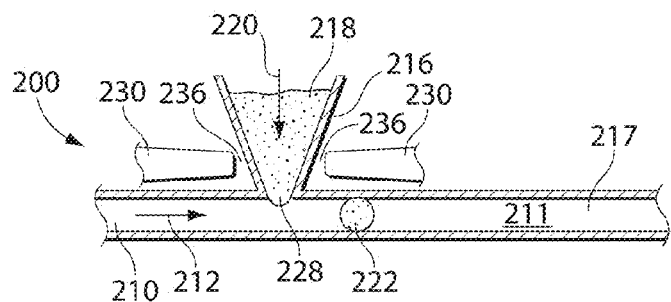
FIGS. 6A-6D show a microfluidic system that can be used to form droplets of various sizes and/or frequencies according to one embodiment of the invention.
Figure 6B:
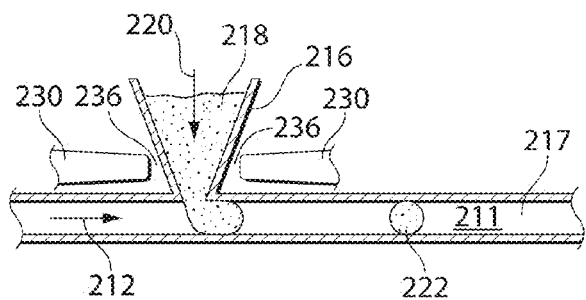

FIG. 6A shows the formation of droplets 222 prior to actuation of valve 230. As shown in this illustrative embodiment, the valve may be separated from subject fluid channel section 216 by a membrane 236, which may be deformable. FIG. 6B shows the shearing of subject fluid 218 by continuous fluid 211 at interconnected region 228. When this occurs, at least a portion of the subject fluid is surrounded by the continuous fluid at or near this region to form droplets 222. The application of a continuous flow rate of the continuous and subject fluids can result in the formation of a plurality of droplets 222 having the same or a substantially similar size/volume. During and after droplet formation, the continuous fluid continues to flow in channel section 217 positioned downstream of the interconnected region.

Figure 6C:
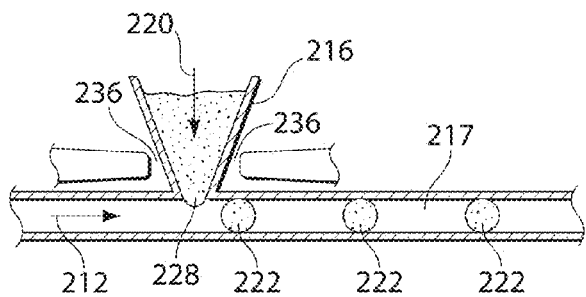

As described in FIGS. 6A-6C, continuous fluid channel 210, subject fluid channel 216, and interconnected region 228 are constructed and arranged such that droplets 222 can be formed without the need to change a cross-sectional dimension of the subject fluid channel or the continuous fluid channel. This can allow continuous formation of a first droplet having a first volume without the need for a valve or other actuating structure. The volume and rate of formation of droplets 222 may be controlled by choosing particular parameters such as the size of interconnected region 228, the width of a continuous fluid channel, the width of a subject fluid channel, the flow rates of the subject fluid and continuous fluids, and the types of subject fluid and continuous fluids used.

Figure 6D:
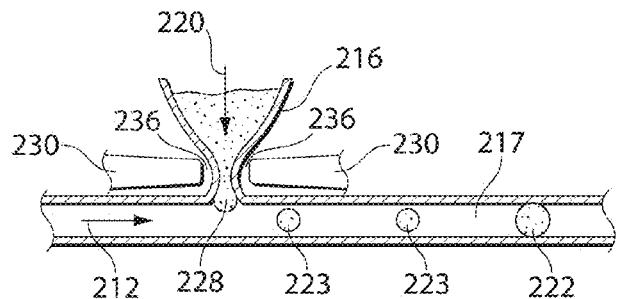

As shown in the embodiment illustrated in FIG. 6D, the actuation of valve 230 can cause deformation of membrane 236. This deformation can result in the constriction of subject fluid channel 216 at interconnected region 228. The reduction of the width of interconnected region 228 can result in the formation of droplets 223 having a smaller size than those of droplets 222. In certain embodiments, valve 230 can cause the width of interconnected region 228 to expand, resulting in the formation of droplets having a larger size than those of droplets 222 (not shown).

In some embodiments, a droplet or a series of droplets are formed without the need to change a flow rate of a subject fluid or a continuous fluid. This can allow continuous formation of droplets of varying size (e.g., having first and second volumes) by applying substantially constant flow rates of the subject fluid and/or continuous fluids during droplet formation. For instance, in some embodiments, a substantially constant pressure or volume source is fluidly connected to an upstream portion of the delivery channel (e.g., at an inlet).

The formation of droplets of a first volume and a second volume by actuation of valve 230 may occur at different rates. That is, the droplets of the second volume may be produced at a different frequency as the frequency of production of droplets of the first volume. In other embodiments, the droplets of the second volume may be produced at the same frequency as the frequency of production of droplets of the first volume. The frequency of droplets formation can be modulated by deforming different parts of the channel system, as described in more detail below.

It should be understood that any suitable valve 230 can be used to deform membrane 236 or otherwise constrict subject fluid channel 216 at interconnected region 228. In one embodiment, a valve comprising a control channel such as one described in connection with FIGS. 1-5 is used as a valve 230. The valve may be a planar valve, in some cases. In other embodiments, a valve is fluidly connected to subject fluid channel 216 and/or continuous fluid channel 210. For example, a portion of the valve may protrude into subject fluid channel 216 to reduce the width of interconnected region 228. That is, instead of the valve deforming a membrane, the valve may obstruct a portion of interconnected region 228 to cause a narrowing of the fluid path. In yet another embodiment, a valve may be positioned above or below subject fluid channel section 216 (e.g., positioned on the same vertical plane as that of subject fluid channel section 216 and/or continuous fluid channel 210). In some cases, the valve includes one or more configurations described above.

Figure 7A:
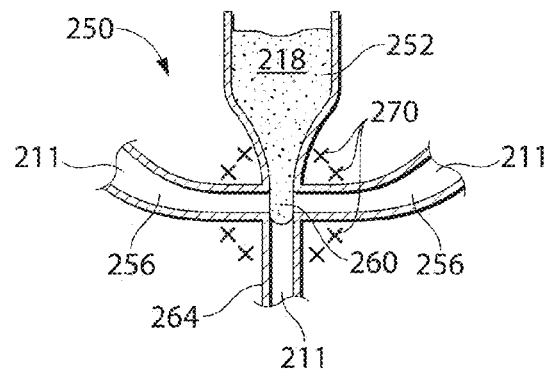
FIGS. 7A-7C show various configurations of microfluidic systems that can be used to form droplets of varying sizes and/or frequencies according to embodiments of the invention.
Figure 7B:
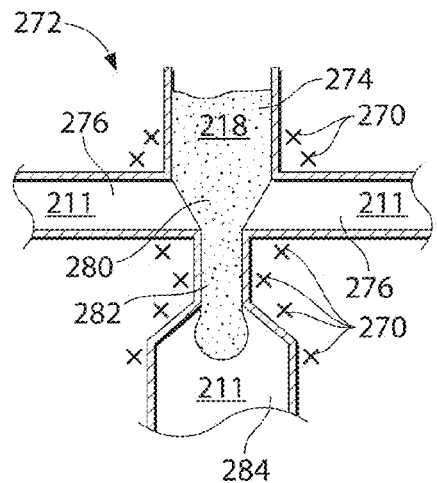
Figure 7C:
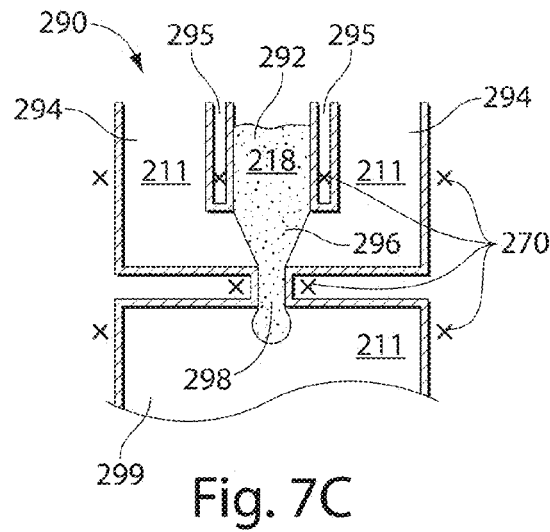

FIGS. 7A-7C show additional configurations of microfluidic systems that can be used to form droplets according to some embodiments of the invention. As shown in the embodiment illustrated in FIG. 7A, microfluidic system 250 may include a subject fluid channel 252 containing a subject fluid 218 and two continuous fluid channels 256 containing a continuous fluid 211. The subject fluid channel and continuous channels meet at an intersection 260, which is fluidly connected to a main channel 264 downstream of interconnected region 260. Droplet formation can be achieved at or near interconnected region 260 by flow focusing. That is, the fluids from the subject fluid and continuous fluid channels meet at the interconnected region, where the fluids are "focused" downstream (e.g., at main channel 264). When the fluids are immiscible (or slightly miscible), a protrusion of subject fluid forms at the interconnected region and extends into the main channel. The protrusion grows as additional subject fluid is injected into the interconnected region. Simultaneously, the injected continuous fluid shears the outer surface of the protruding subject fluid, as they are focused into the main channel. When the shear on the subject fluid due to the continuous fluid exceeds the surface tension holding the subject fluid protrusion in the interconnected region, a droplet of subject fluid is pinched off and dispersed into the continuous fluid and flows away from the interconnected region down the main channel. This process repeats and forms droplets of the same size at a periodic rate. This is the so called "dripping" regime of flow focus droplet formation. Using this method, droplet formation can occur without the need to change a cross-sectional dimension of the subject fluid channel, the continuous fluid channels, the main channel, or the interconnected region. That is, a valve or other actuating structure is not needed in order to form the droplets. In addition, droplets of substantially uniformed size can be obtained.

In some embodiments, microfluidic systems 250 includes one or more valves 270 that can be positioned at various locations with respect to a subject fluid channel, a continuous fluid channel, an interconnected region, and/or a main channel. Various locations of valves 270 are shown in FIG. 7A. Upon the actuation of one ore more valves 270, the subject fluid channel, continuous fluid channel, interconnected region, and/or a main channel may be deformed (e.g., constricted and/or narrowed, or expanded) to allow formation of droplets having a second volume and/or a second frequency compared to the droplets formed prior to actuation of the one or more valves. For example, one or more valves may be constructed and arranged to change a cross-sectional dimension of a subject fluid channel, one of more continuous fluid channels, an interconnected region, and/or a main channel, whereby droplets of subject fluid of varying size and/or varying frequency can be produced based on the position of the one or more valves. That is, the size and/or frequency of the droplets can be varied depending on the location of the valve actuated and/or the degree of actuation.

FIG. 7B shows a microfluidic system 272 including the subject fluid channel 274 containing a subject fluid 218 fluidly connected to continuous fluid channel 276 containing continuous fluid 211. The continuous fluid channels and the subject fluid channel meet at interconnected region 280. Downstream of the interconnected region is a fluid constriction region 282 having at least one cross-sectional dimension smaller than a cross-sectional dimension of the subject fluid channel and/or the continuous fluid channels. Droplets of the subject fluid can be formed between the channel constriction region and main channel 284, e.g., by the shearing of the subject fluid by the continuous fluid at interconnected region 280. This droplet formation can occur without the need to change a cross-sectional dimension of the subject fluid channel, the one or more continuous fluid channels, the interconnected region, the channel constriction region, or the main channel. Subsequently, upon actuation of one or more valves 270, the volume (amplitude) and/or frequency of the droplets can be changed relative to the droplets formed prior to actuation of the one or more valves.

FIG. 7C shows yet another embodiment of a microfluidic system that can be used to form droplets according to one embodiment of the invention. As shown in the embodiment illustrated in FIG. 7C, microfluidic system 290 includes a subject fluid channel 292 containing a subject fluid 218 fluidly connected to continuous fluid channels 294 containing a continuous fluid 211. The subject fluid and continuous fluid channels are separated by walls 295, which may be deformable in some embodiments. As shown in this exemplary embodiment, the subject fluid channel and continuous fluid channels are fluidly connected to channel constriction region 298 and main channel 299. The microfluidic system may include one or more valves 270 at various positions relative to the one or more channels. As described herein, formation of droplets can be achieved without the need to change a cross-sectional dimension of the subject fluid channel, the one on one continuous fluid channels, the interconnected region, the channel constriction region, or the main channel. Upon actuation of one or more valves 270, a change in a characteristic of the droplets may be achieved. The one or more valves may be actuated to varying degrees so as to cause the continuous formation of droplets having different characteristics (e.g., volume and/or frequency).

Figure 8:
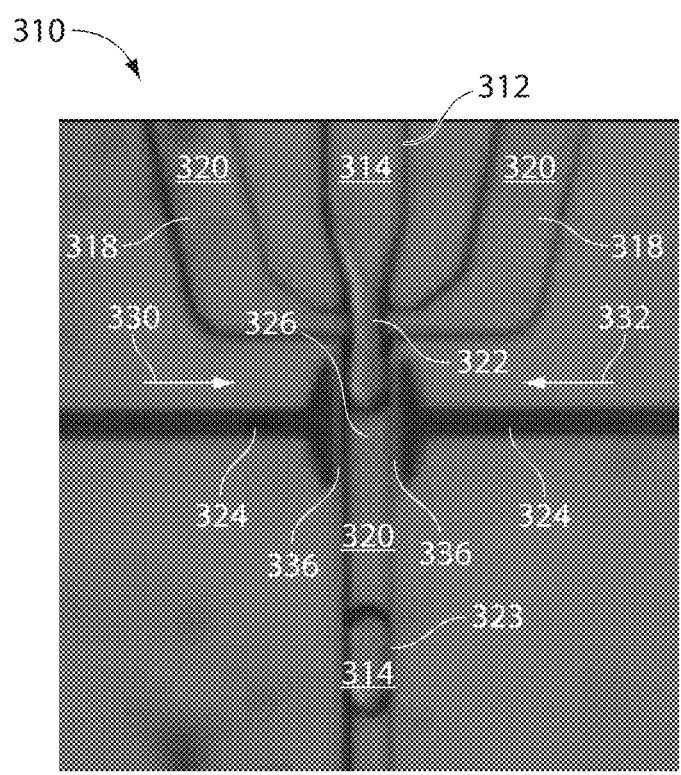
FIG. 8 shows a photograph of a microfluidic system that can be used to form droplets of varying volume and/or frequency according to one embodiment of the invention.

FIG. 8 shows microfluidic system 310 that can be used to form droplets of varying volume and/or frequency according to one embodiment of the invention. As shown in this illustrative embodiment, microfluidic system 310 includes a subject fluid channel 312 containing a subject fluid 314 fluidly connected to continuous fluid channels 318 containing continuous fluid 320. The subject fluid channel and continuous fluid channels meet at interconnected region 322 where the continuous fluid can shear portions of the subject fluid to form droplets 323. As shown in this illustrative embodiment, droplet 323 was formed prior to actuation of valve 324, which are constructed and arranged to constrict a portion of main channel 326. That is, droplet 323 was formed without the need to change a cross-sectional dimension of the subject fluid channel 312, one or more continuous fluid channels 318, interconnected region 322, or main channel 326.

Valve 324 may be a valve similar to the ones described in connection with FIGS. 1-5 and may include a control channel 328, e.g., for containing a fluid. The flowing of a fluid into control channel 328 in the direction of arrows 330 and 332 can cause the control channels to expand. This, in turn, can result in the deformation of membrane 336 positioned between the control channel and main channel 326. This deformation of the membrane can result in the constriction of main channel 326. Because the valves 324 are positioned adjacent to connected region 322 where the continuous fluid can shear the subject fluid, the actuation of the valve can vary one or more characteristics of the droplets formed. For example, the actuation of valves 324 can result in the narrowing of main channel 326, causing droplets having a smaller volume to be formed due to the reduced volume of the main channel at this region. In other embodiments, a vacuum or another reduced pressures source can be fluidly connected to control channel 328 to cause expansion of the main channel. This can result in the formation of droplets having a larger volume due to the increased volume of the main channel at this region.

In one embodiment, a method of the invention involves production of a series of single, substantially uniform droplets having a first volume and comprising a subject fluid, the droplets being surrounded by a continuous fluid (e.g., a liquid) in a microfluidic system. Such droplet formation may be achieved without the need to change a cross-sectional dimension of a channel of the microfluidic system during use, as described herein. The method also includes changing a cross-sectional dimension of a channel of the microfluidic system so as to produce droplets comprising the subject fluid having a second volume different from the first volume. The formation of the droplets of the first and second volumes can also be achieved, in some embodiments, by applying substantially constant flow rates of the subject fluid and the continuous fluid. That is, the flow rates of the subject fluid and continuous fluid (e.g., at an inlet) do not need to be varied in order to cause the formation of droplets of varying volumes. In some embodiments, a substantially constant pressure or volume source is fluidly connected to an upstream portion of the subject fluid and continuous fluid channels (e.g., at an inlet). Furthermore, the production of droplets of the second volume may be produced at the same or a different frequency of the frequency of the production of droplets of the first volume.

Figure 9A:
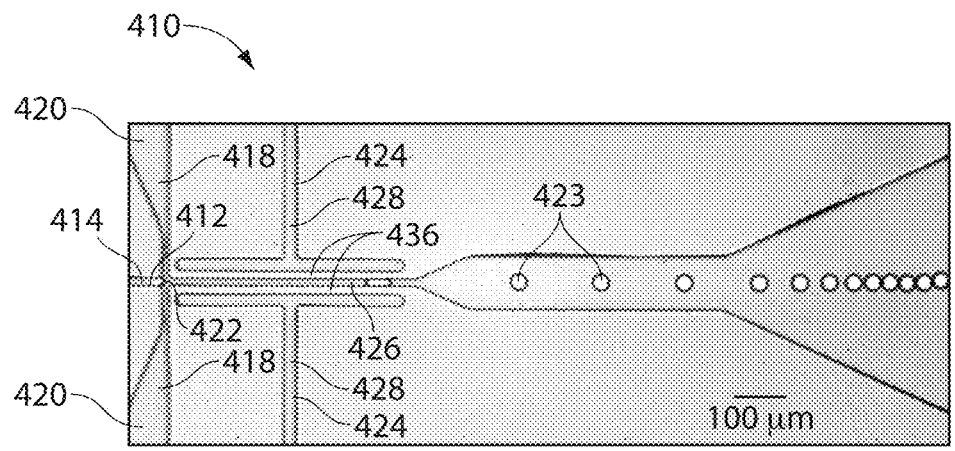
FIGS. 9A and 9B show photographs of a microfluidic system that can be used to form droplets of varying volume according to one embodiment of the invention.

As shown in the embodiment illustrated in FIG. 9A, microfluidic system 410 can be used to form droplets of varying volume according to one embodiment of the invention. As shown in this illustrative embodiment, microfluidic system 410 includes a subject fluid channel 412 containing a subject fluid 414 fluidly connected to continuous fluid channels 418 containing continuous fluid 420. The subject fluid channel and continuous fluid channels meet at interconnected region 422 where the continuous fluid can shear portions of the subject fluid to form droplets 423. As shown in the illustrative embodiment of FIG. 9A, droplets 423 of substantially uniform volume were formed prior to actuation of valve 424, which are constructed and arranged to constrict a portion of main channel 426. That is, droplets 423 were formed without the need to change a cross-sectional dimension of the subject fluid channel 412, one or more continuous fluid channels 418, interconnected region 422, or main channel 426.

Figure 9B:
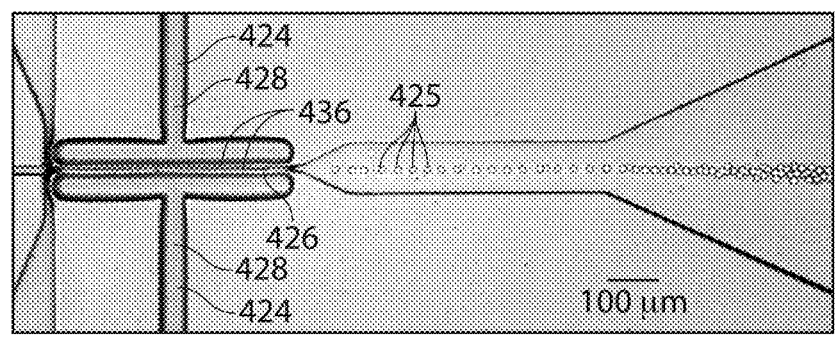

Valve 424 may be a valve similar to the ones described in connection with FIGS. 1-5 and may include a control channel 428, e.g., for containing a fluid. As shown in FIG. 9B, the flowing of a fluid into control channel 428 can cause the control channels to expand. This, in turn, can result in the deformation of membrane 436 positioned between the control channel and main channel 426. This deformation of the membrane can result in the constriction of main channel 426. Because valves 424 are positioned adjacent to the droplet formation region, the actuation of the valve can vary one or more characteristics of the droplets formed. For example, the actuation of valves 424 can result in the narrowing of main channel 426, causing droplets 425, having a substantially uniform volume and a smaller volume than droplets 423, to be formed due to the reduced volume of the main channel at this region. In other embodiments, a vacuum or another reduced pressure source can be fluidly connected to control channel 428 to cause expansion of the main channel. This can result in the formation of droplets having a larger volume due to the increased volume of the main channel at this region.

Figure 10:
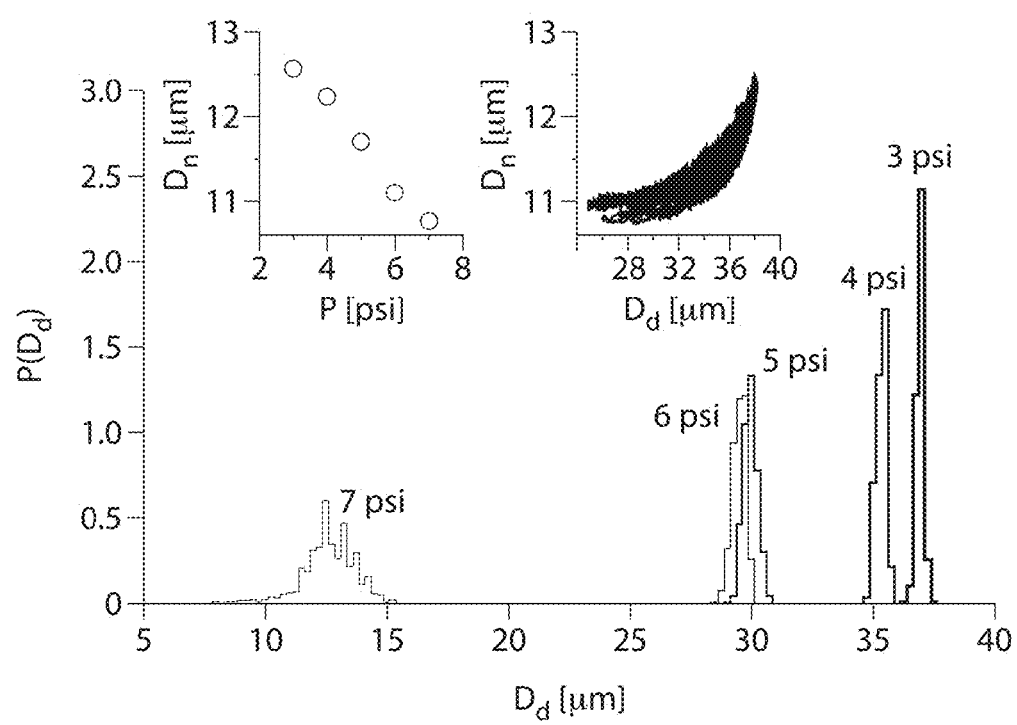
FIG. 10 shows a plot illustrating droplet size distributions for different pressures applied to the control channels shown in FIG. 9 according to one embodiment of the invention.

FIG. 10 shows a plot illustrating droplet size distributions for different pressures applied to control channels 428 of FIG. 9 according to one embodiment of the invention. As shown in this exemplary embodiment, increasing the pressure in the control channel can result in the formation of smaller droplets.

A series of microfluidic droplets (e.g., "droplet trains") can carry information and chemicals that can be used to perform and monitor chemical reactions with limited external oversight. Central to this process is the ability to write and read information. In some embodiments, the fluidic systems described herein are capable of writing analog information to a microfluidic droplet train. By modulating the size of droplets in the train, amplitude modulation information can be encoded. Likewise, by modulating the frequency at which droplets are produced in the train, frequency modulation information can be encoded. Both forms of information are stored and transmitted by flowing the train through channels, and both can be read back using a detector to monitor droplet size and frequency.

Figure 11A:
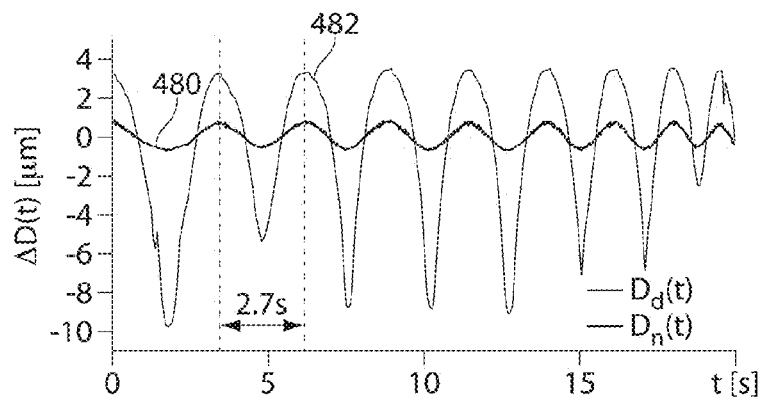
FIGS. 11A-11C show that microfluidic systems described herein can be used to store AM information in a series of droplets by modulating droplet size according to one embodiment of the invention.
Figure 11B:
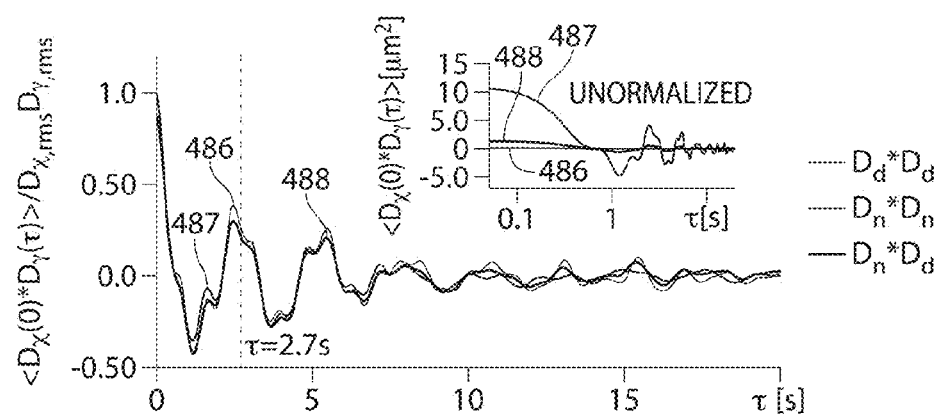
Figure 11C:
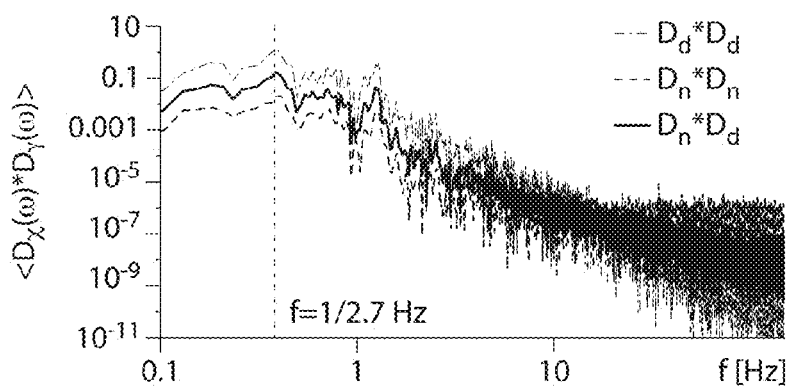

In some embodiments, articles and methods described herein can be used to store AM information in a series of droplets by modulating droplet size. As shown in the embodiment illustrated in FIG. 11A, valve 424 of FIGS. 9A and 9B were actuated to cause a change in dimension of the main channel as a function of time. The change in dimension of the main channel is shown by line 480 while the change in dimension of the droplets is shown by line 482. As shown in the embodiment illustrated in FIG. 11B, auto correlation was performed for the droplet diameter (line 486), main channel diameter (line 487), and cross-correlation of the droplet and main channel diameter (line 488). FIG. 11C shows the auto- and cross power spectra of the time signals in FIG. 11A. These curves show the spectral power is distributed similarly in both signals; that is, the spectra for the valve control channel signal and the measured droplet size are similar up to about 2 Hz. This shows that these two signals are made up of the same tones and that the signals being applied to the valve can be reconstructed by monitoring the droplets.

In some embodiments, the amplitude and/or frequency of a series of droplets can be modulated using the articles and methods described herein. In some cases, the amplitude and frequency of droplet formation can be varied independently of one another. In one embodiment, a method of the invention involves the production of a series of single, substantially uniformed droplet comprising a subject fluid at a first frequency, the droplets being surrounded by a continuous liquid. This droplet formation can be achieved without the need to change a cross-sectional dimension of a channel of a microfluidic system used to produce the droplets. The method also includes changing a cross-sectional dimension of a channel of the microfluidic system so as to produce droplets comprising the subject fluid at a second frequency different from the first frequency. The droplets formed at the first frequency may have the same or a different volume as the droplets formed at the second frequency. Additionally, substantially constant flow rates of the subject fluid and/or continuous fluid may be applied during production of the droplets.

In certain embodiments, a subject fluid channel and/or a continuous fluid channel(s) (e.g., of a flow focusing region) may combined with a bypass channel system (e.g., as shown in FIGS. 1A-1D). For instance, the subject fluid channel and/or continuous fluid channel(s) may be the "first channel section" fluidly connected to a "second channel section" or bypass channel via an intersection. The bypass channel can allow allowing excess fluid from a delivery channel fluidly connected to the first channel section to circumvent the downstream flow-focusing region by flowing in the bypass channel instead. This configuration can allow, in some embodiments, the flow of fluid in the subject channel and/or continuous fluid channel(s) to be reduced/increased independently of fluid flow in other channels of the microfluidic system. This configuration can also allow the variation of flow rate of the subject and/or continuous fluids without varying the source of fluid flow connected to the subject channel and/or continuous fluid channel(s). In some cases, a substantially constant pressure source or a substantially constant volume source may be fluidly connected to a continuous fluid channel and/or subject fluid channel. Combinations of substantially constant pressure and volume sources are also possible.

Figure 12A:
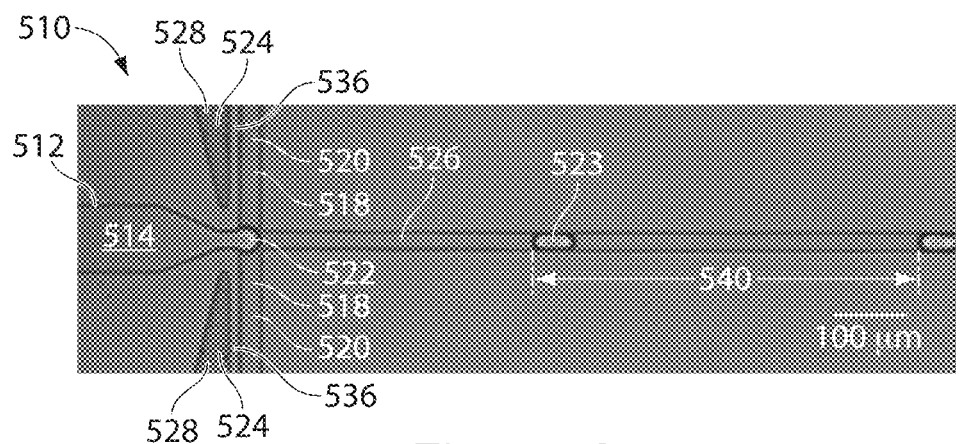
FIGS. 12A and 12B show a microfluidic system that can be used to form droplets of varying frequency according to one embodiment of the invention.

FIG. 12 shows microfluidic system 510 that can be used to form droplets of varying frequency according to one embodiment of the invention. As shown in this illustrative embodiment, microfluidic system 510 includes a subject fluid channel 512 containing a subject fluid 514 fluidly connected to continuous fluid channels 518 containing continuous fluid 520. The subject fluid channel and continuous fluid channels meet at interconnected region 522 where the continuous fluid can shear portions of the subject fluid to form droplets 523. As shown in the illustrative embodiment of FIG. 12A, droplets 523 of substantially uniform volume and having a first frequency shown by distance 540 were formed prior to actuation of valve 524, which are constructed and arranged to constrict a portion of continuous fluid channel 518. That is, droplets 523 were formed without the need to change a cross-sectional dimension of the subject fluid channel 512, one or more continuous fluid channels 518, interconnected region 522, or main channel 526.

Figure 12B:
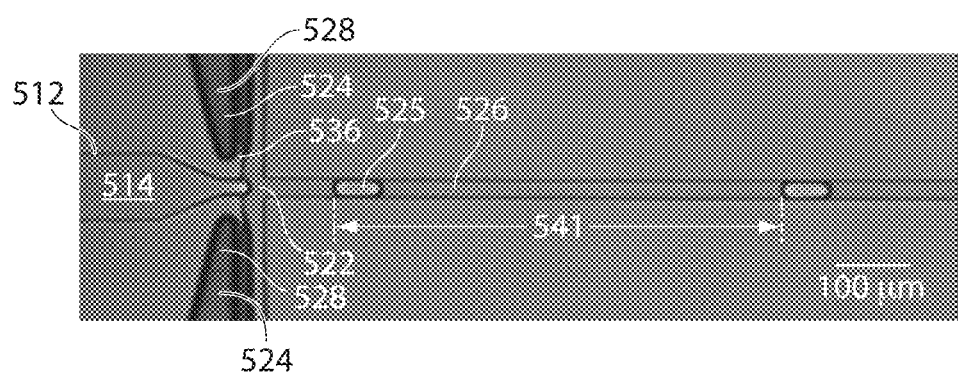

Valve 524 may be a valve similar to the ones described in connection with FIGS. 1-5 and may include a control channel 528, e.g., for containing a fluid. As shown in FIG. 12B, the flowing of a fluid into control channel 528 can cause the control channels to expand. This, in turn, can result in the deformation of membrane 536 positioned between the control channel and continuous fluid channel 518. This deformation of the membrane can result in the constriction of continuous fluid channel 518. Because valves 524 are positioned adjacent to the droplet formation region, the actuation of the valve(s) can vary one or more characteristics of the droplets formed. For example, the actuation of valves 524 can result in the narrowing of continuous fluid channel 518, causing droplets 525 to be formed. Droplets 525 have a second frequency different from the first frequency, which is shown by a distance 541 longer than distance 540.

In some embodiments, the droplets can be varied in frequency independently of droplet size. As described above, droplet formation may begin by the formation of a protrusion of subject fluid. In the "dripping" regime, for fixed surface tension and shear rate, the frequency at which droplets are produced is determined, at least in part, by the fill-rate of the subject fluid protrusion. Therefore, the frequency of droplet formation can be modulated by, for example, using a valve to modulate the flow rate of the subject fluid as it is injected into the interconnected region. This can be achieved by, for example, choosing appropriate flow rates of the subject fluid and continuous fluid (which may be held substantially constant) and actuating a valve associated with a continuous fluid channel near the interconnected region. Because the valve changes the flow rate of the carrier fluid and does not change surface tension or shear rate, droplets pinch off at the same size but at a different rate.

In some embodiments, the modulation of frequency only can be facilitated by using a device include continuous fluid channels 518 fluidly connected to a bypass channel such that actuation of valves 524 causes the continuous fluid channels to be constricted, the bypass channel allowing excess fluid to circumvent the flow-focusing region (including interconnected region 522). The flow rate of the continuous fluid at the interconnected region can be reduced so that droplets are produced at a slower rate. In certain embodiments, the independent modulation of frequency can be achieved using a substantially constant volume source (or a substantially constant pressure source) fluidly connected to a continuous fluid channel and/or subject fluid channel.

Figure 13:
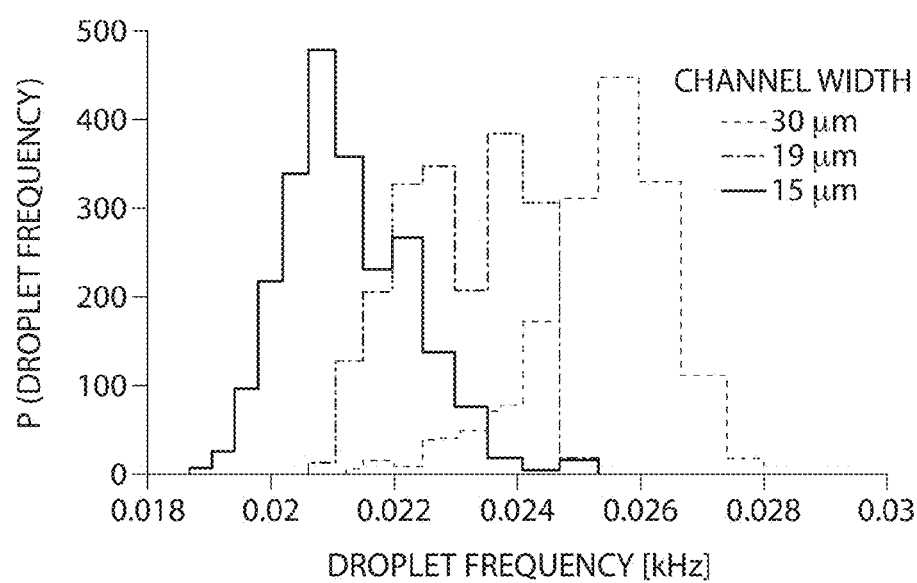
FIG. 13 is a plot showing droplet production frequency distribution for different pressures applied to control channels of the microfluidic system shown in FIGS. 12A and 12B according to one embodiment of the invention.

FIG. 13 shows a plot illustrating droplet production frequency distributions for different pressures applied to continuous fluid channels 518 of FIGS. 12A and 12B. As shown in this illustrative embodiment, an increase of the width of the continuous fluid channels can result in an increase in the frequency of droplet production. The width of the continuous fluid channels were varied by actuating valves 524 (e.g., by applying pressure to control channels 528). In this particular embodiment, the flow rate of the continuous fluid was held substantially constant at 100 µL/hr and the flow rate of the subject fluid was held substantially constant at 10 µL/hr.

The flow rates of the fluids introduced into the system were held substantially constant.

Figure 14A:
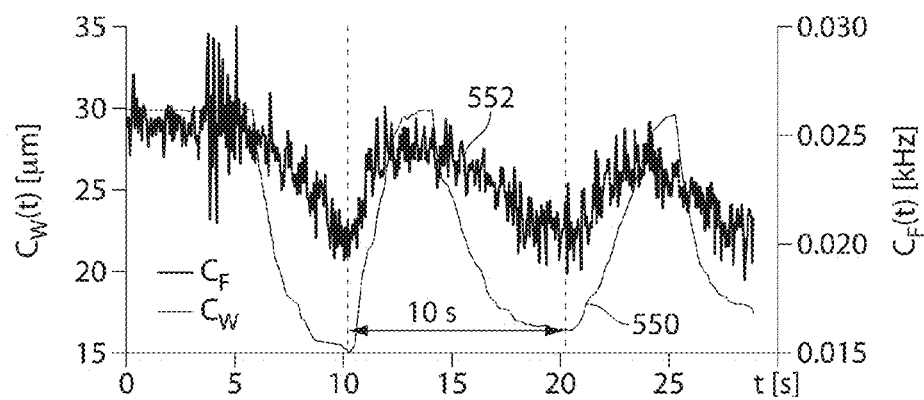
FIGS. 14A-14C show that a microfluidic system can be used to store FM information in a series of droplets by modulating droplet production frequency according to one embodiment of the invention.
Figure 14B:
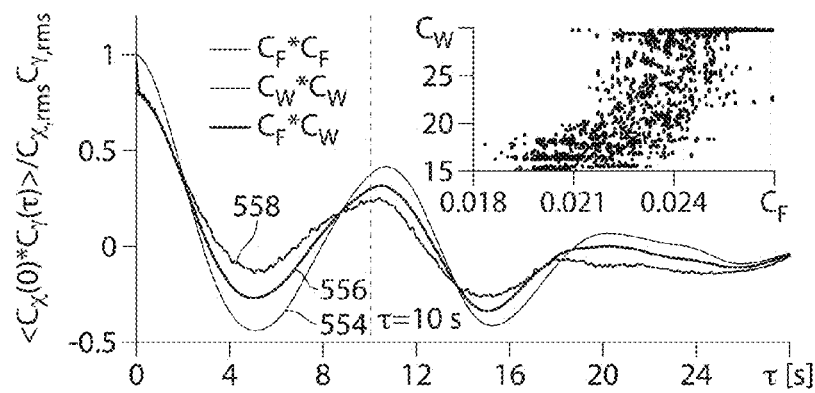
Figure 14C:
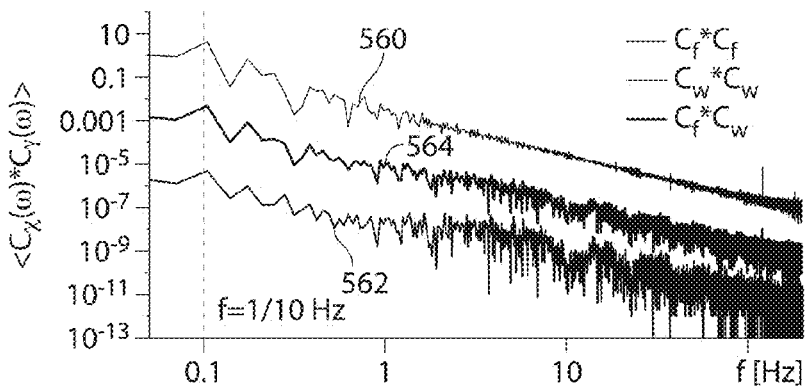

FIGS. 14A-14C show that FM information can be stored in a sequence of droplets by modulating droplet production frequency. In this particular embodiment, microfluidic system 510 of FIGS. 12A and 12B was used and a flow rate of the continuous fluid was held substantially constant at 100 µL/hr, while the flow rate of the subject fluid was held substantially constant at 10 µL/hr. That is, the flow rates of these fluids were not varied as the fluids were introduced into the microfluidic system. FIG. 14A shows raw time series of the continuous fluid channel (line 550) and droplet frequency (line 552). FIG. 14B shows a plot illustrating auto correlation of the width of the continuous fluid channel (line 554), droplet frequency (line 556), and the cross-correlation of the continuous fluid channel width and drop frequency (line 558). FIG. 14C shows a plot illustrating auto-power spectrum of the continuous fluid channel width (line 560), drop frequency (line 562), and the cross-power spectrum of the continuous fluid channel width and droplet frequency (line 562).

In another embodiment of invention, multiple droplet formation regions (e.g., flow focusing regions) can be positioned in series to form multiple emulsions. For example, more than one and/or a combination of the microfluidic systems described in connection with FIGS. 6-9 and 12 may be positioned in series in some embodiments. Accordingly, a microfluidic system that can be used to form multiple emulsions may include, for example, more than one set of continuous fluid channels, subject fluid channels, interconnected regions, and/or main channels. In addition, more than one set of valves (e.g., planar valves) may be associated with one or more channels or channel regions of the microfluidic system. For instance, a microfluidic system may include a first flow focusing region (or any other suitable droplet formation region) and a second flow focusing region (or any other suitable droplet formation region) positioned downstream of the first flow focusing region. A valve or set of valves may be associated with the first and/or second flow focusing regions such that the valve or set of valves can vary a cross-sectional dimension of a continuous fluid channel, a subject fluid channel, an interconnected region, a fluid constriction region, and/or a main channel. For example, in one particular embodiment, a valve or set of valves may be associated with an upstream flow focusing region but not a downstream flow focusing region. In another embodiment, a valve or set of valves may be associated with a downstream flow focusing region but not an upstream flow focusing region. In yet other embodiments, a valve or set of valves may be associated with both an upstream and a downstream flow focusing region. A microfluidic system may also include more than two (e.g., 3, 4, 5, etc.) flow focusing regions or any other suitable droplet formation regions positioned in series.

By using valve-based flow focusing at the various stages in a microfluidic system to form multiple emulsions, one may control the size and the frequency of the droplets produced without changing or the need to change the applied flow rate of either the subject fluid or the continuous fluid (e.g., at the inlets). For example, by placing one or more valves at an upstream flow focusing region, the size of the droplets can be varied such that they are small, and are later encapsulated in a larger droplet downstream. The articles and methods described herein may increase the number of different types of multiple emulsion droplets that can be produced in a microfluidic device, since one can reduce the size of a channel to form droplets that are much smaller than that which can be fabricated in a similar device without such valves associated with the channels. Examples of sizes of droplets that can be produced in the systems described herein are provided below.

Figure 15A:
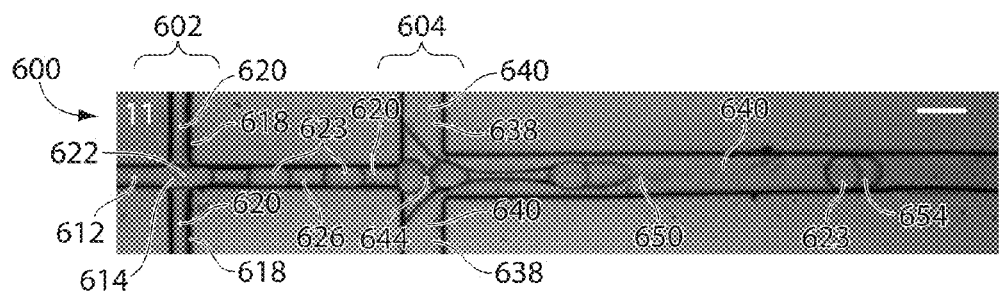
FIGS. 15A-15D show microfluidic systems including multiple flow focusing regions positioned in series that can be used to form multiple emulsions according to one embodiment of the invention.

FIG. 15A shows microfluidic system 600 that can be used to form multiple emulsions according to one embodiment of the invention. As shown in this illustrative embodiment, microfluidic system 600 includes a first (upstream) flow focusing region 602 and a second (downstream) flow focusing region 604. The first flow focusing region includes a subject fluid channel 612 containing a subject fluid 614 fluidly connected to continuous fluid channels 618 containing continuous fluid 620. The subject fluid channel and continuous fluid channels meet at interconnected region 622 where the continuous fluid can shear portions of the subject fluid to form droplets 623. Droplets 623 were formed without the need to change a cross-sectional dimension of the subject fluid channel 612, one or more continuous fluid channels 618, interconnected region 622, or main channel 626.

Microfluidic system 600 also includes second flow focusing region 604 including a continuous fluid channel which is the same as main channel 626, which contains a subject fluid for flow focusing region 604 in the form of droplets 623 and continuous fluid 620. Main channel 626 is fluidly connected to continuous fluid channels 638 which may contain a second continuous fluid 640 (e.g., a "carrier fluid"). Second continuous fluid 640 may be immiscible or slightly miscible with subject fluid 614 and/or continuous fluid 620. As shown in this illustrative embodiment, continuous fluid channels 638 are fluidly connected to main channel 626 by interconnected region 644. A second main channel 650 is positioned downstream of this interconnected region. At the interconnected region, second continuous fluid 640 can shear portions of the fluid in main channel 626 (droplets 623 and/or continuous fluid 620) to form droplets 654. Accordingly, droplets 623 may be encapsulated within droplets 654, which in turn may be carried by second carrier fluid 640 to form a multiple-fluid emulsion. Droplets 654 can be formed without the need to change a cross-sectional dimension of the channels associated with flow focusing regions 602 and/or 604. In other embodiments, however, one or more valves (e.g., a planar valve) may be associated with one or more channels or channel regions of flow focusing region 602 and/or 604 as described herein.

Figure 15B:
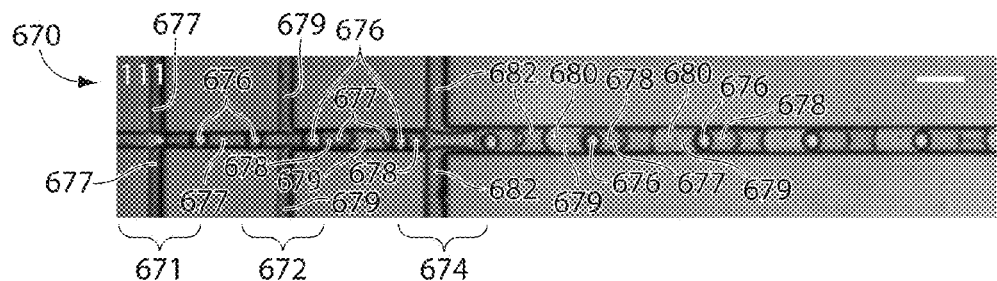
Figure 15C:
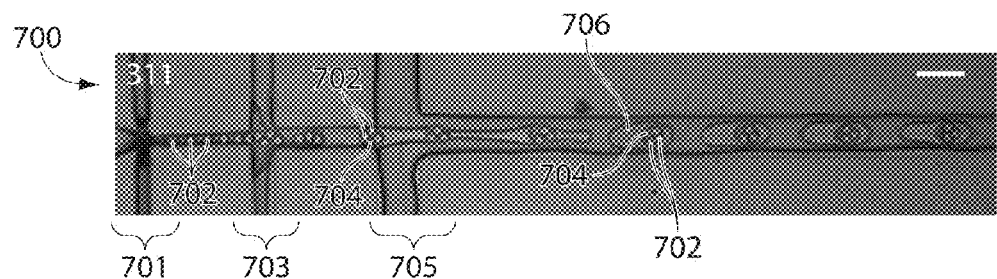

As shown in the embodiment illustrated in FIG. 15B, three flow focusing regions can be positioned in series. For example, microfluidic system 670 includes a first flow focusing region 671, a second flow focusing region 672, and a third flow focusing region 674. First flow focusing region 671 produces droplets 676 containing a first subject fluid carried by continuous fluid 677. Second flow focusing region 672 forms droplets 678 containing both droplets 676 and continuous fluid 677. Droplets 678 are carried by a second continuous fluid 679. Third flow focusing region 674 can be used to produce droplets 680 which contain droplets 678 comprising both droplets 676 and continuous fluids 677. Droplets 680 also contains continuous fluid 679. Droplets 680 are carried by a continuous fluid 682.

In some embodiments, a droplet can contain multiple droplets of the same or a substantially similar size. For example, microfluidic system 700 may include a first flow focusing region 701 used to produce small droplets 702 of substantially similar size. These droplets can be encapsulated at a second flow focusing region 703 to form droplets 704 containing multiple droplets 702. At a third flow focusing region 705, droplets 704 can be encapsulated within droplet 706.

Figure 15D:
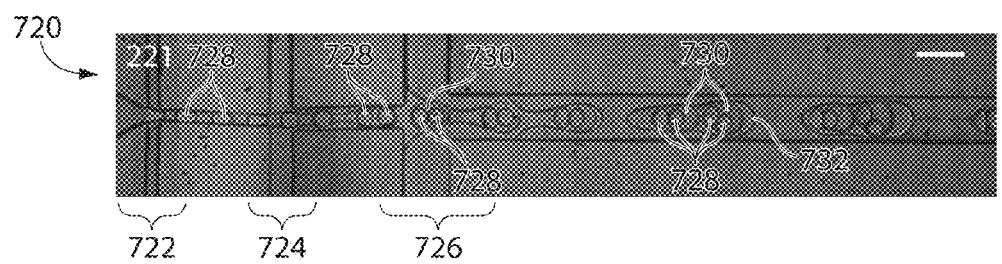

Furthermore, a microfluidic system may be used to encapsulate multiple droplets of a first type, each of the droplets of the first type containing multiple droplets of a second type. For example, as illustrated in the embodiment shown in FIG. 15D, microfluidic system 720 may include a first flow focusing region that can be used to produce droplets 728 of a first fluid. Multiple droplets 728 can be encapsulated within a droplet 730 produced by second flow focusing region 724. Droplets 730 can be encapsulated at a third flow focusing region 726 to produce droplets 732, which contain multiple droplets 730, each of which contain multiple droplets 728.

As illustrated in FIGS. 15A-15D, in addition to droplets being circular in shape (e.g., having a circular cross-section), other shapes of droplets can be also be formed.

It should be understood that the embodiments described herein are exemplary and that other configurations of channels and components of microfluidic systems can be combined to produce embodiments within the scope of the invention using methods known to those of ordinary skill in the art along with the description provided herein. In addition, the arrangements of the microfluidic systems described herein are highly schematic, and are intended only to represent the variety of fluid manipulations that can be performed in accordance with the invention. For example, it is to be understood that the specific distribution of droplets will vary depending upon factors such as immiscibility (incompatibility) of the continuous fluid and the subject fluid (which may be characterized by difference in contact angle measurements of the fluids, or other characteristics known in the art), flow rate, size and shape of the channels, and the like. In another example, although a subject fluid channel of triangular cross-sectional shape is illustrated in FIG. 6, it is to be understood that channel sections and regions such as flow constriction region 282 of FIG. 7B of essentially any size and cross-sectional shape can be used (e.g., square, rectangular, triangular, ovoid, circular).

In another aspect of the invention, a microfluidic system may include a valve described herein and one or more reservoirs for positioning and/or storing droplets or other components. As shown in the embodiment illustrated in FIG. 16, microfluidic system 810 includes a delivery channel 814 including an upstream portion 816 and a downstream portion 818. The microfluidic system also includes a first channel section 824 and a second channel section 828 downstream of and fluidly connected to the delivery channel at a junction 832. The hydrodynamic resistances of a first and a second channel section may be different prior to and/or independently of any actuation of a component (e.g., a valve) of the system and/or without the need to change a cross-section of the first or second channel sections. For example, as shown in this illustrative embodiment, first channel section 824 has a relatively higher resistance to fluid flow than second channel section 828. Accordingly, when a valve 838 is not actuated, fluid and droplets 833 may prefer to flow through the second channel section.

Valve 838, which is adjacent the second channel section, may be constructed and arranged to restrict or increase fluid flow in the second channel section, and thereby able to vary hydrodynamic resistance in the second channel section. Although any suitable valve can be used in the microfluidic system, in one embodiment the valve comprises a control channel 840 adjacent second channel section 824 and not fluidly connected to the second channel section. The control channel may include, for example, a microfluidic channel that can be actuated by applying a positive pressure or a reduced pressure (e.g., a vacuum) to an inlet 841 of the control channel. In some embodiments, the control channel does not include an outlet and application of pressure causes the control channel to expand or contract. In other embodiments, however, the control channel may include an outlet.

Figure 16:
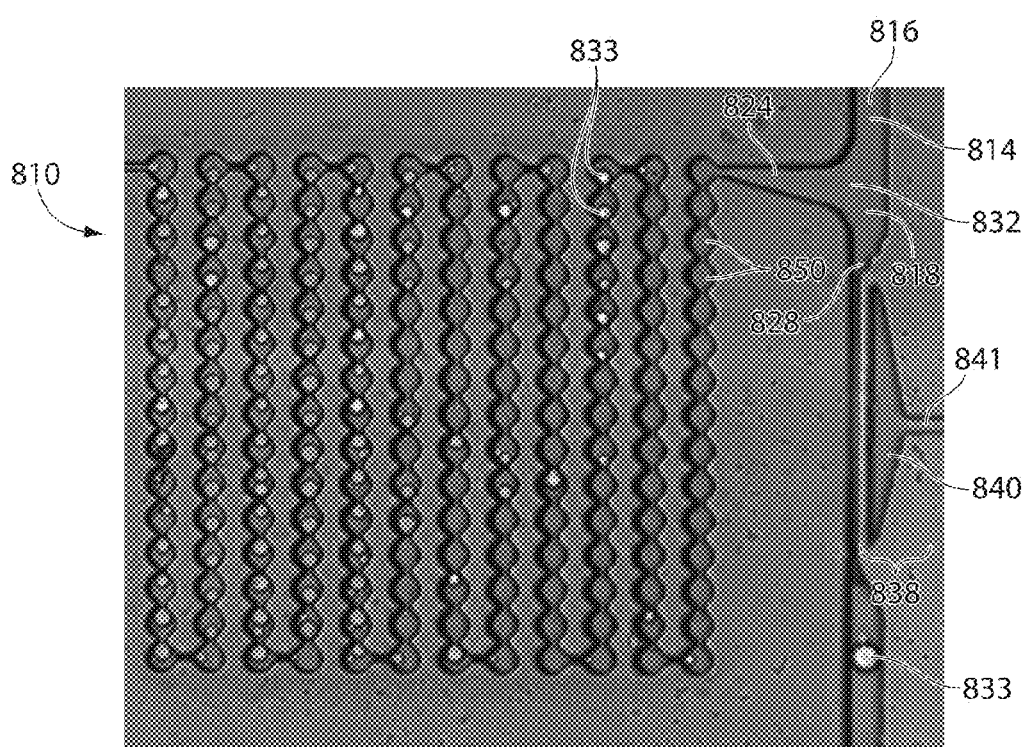
FIG. 16 shows a planar valve coupled with reservoirs that can be used to store droplets according to one embodiment of the invention.

When valve 838 is actuated, as shown in FIG. 16, a portion of second channel section 828 is constricted and the hydrodynamic resistance in this channel increases. This causes the droplets and the carrier fluid to flow into first channel section 824 and into reservoirs 850. Reservoirs 850 and other potentially-suitable components are described in more detail in U.S. Patent Application Ser. No. 61/048,304, filed Apr. 28, 2008, entitled "MICROFLUIDIC STORAGE AND ARRANGEMENT OF DROPS", by Schmitz et al., which is incorporated herein by reference in its entirety. The flow rate, size of droplets 833, and configuration of reservoirs 850 can be modified to trap a single droplet in one reservoir, in some embodiments.

Microfluidic system 810 and methods described herein can be used, for example, for performing automated time-results measurements. For instance, by actuating a single valve, droplets can be flowed into a reservoir or a series of reservoirs that can be used as storage chambers. By releasing the valve, the droplets can be trapped in the reservoirs. This can permit automated trapping, detection and release using unidirectional flow and a single valve (although additional valves may be incorporated into the microfluidic system). This can allow decoupling of what is happening with the source of fluid flow (e.g., a syringe pump) from the actions that are taken to perform observations and/or manipulations of the droplets. This can also allow the control of manipulation of droplets even while applying a substantially constant flowrate to an inlet of the microfluidic system. In addition, microfluidic systems such as the one described in FIG. 16 can be used to cycle in a first set of droplets, observe the first set, and then flow them out to bring in a second set of droplets using only a single valve.

Certain aspects of the invention provide for formation of discontinuous, or isolated, regions (e.g., droplets) of a subject fluid in a continuous fluid, with these fluids optionally separated by one or more intermediate fluids. These fluids can be selected among essentially any fluids (liquids, gases, and the like) by those of ordinary skill in the art, by considering the relationship between the fluids. For example, the subject fluid and the dispersing fluid may be selected to be immiscible within the time frame of formation of the dispersed portions. Where the dispersed portions remain liquid for a significant period of time, the fluids may be significantly immiscible. Where, after formation of dispersed portions, the dispersed portions are quickly hardened by polymerization or the like, the fluids need not be as immiscible. Those of ordinary skill in the art can select suitable immiscible fluids, using contact angle measurements or the like, to carry out the techniques of the invention.

In addition, a subject and/or a continuous fluid may contain other components such as cells, beads, drugs, or other bioactive or non-bioactive agents in some embodiments. Embodiments described herein can be used to form a variety of dispersed fluid sections or particles for use in medicine (e.g., pharmaceuticals), skin care products (e.g. lotions, shower gels), foods (e.g. salad dressings, ice cream), ink encapsulation, paint, micro-templating of micro-engineered materials (e.g., photonic crystals, smart materials, etc.), foams, and the like. Highly monodisperse and concentrated liquid crystal droplets produced according to the invention can self-organize into two and three dimensional structures, and these can be used in, for example, novel optical devices.

Subject fluid dispersion can be controlled by those of ordinary skill in the art, based on the teachings herein, as well as available teachings in the field of flow focusing. Reference can be made, for example, to "Generation of Steady Liquid Microthreads and Micron-Sized Monodispersed Sprays and Gas Streams," *Phys. Rev. Lett.*, 80:2, Jan. 12, 1998, Ganan-Calvo, as well as numerous other texts, for selection of fluids to carry out the purposes of the invention. Control of continuous fluid flow rate, and ratio between the flow rates of continuous fluids and subject fluids, can be used to control subject fluid stream and/or dispersion/droplet size, and monodispersity versus polydispersity in fluid dispersions. The microfluidic devices described herein, coupled with flow rate and ratio control as taught herein, allow significantly improved control and range. The size of the dispersed portion (e.g., droplets) can range down to less than one micron in diameter. The droplets may have a size of, for example, less than 1 micron, less than 0.5 microns, less than 0.1 microns, less than 0.05 microns, or less than 0.01 microns in some embodiments.

A variety of materials and methods can be used to form components of a fluidic system. In some cases various materials selected lend themselves to various methods. For example, components of a system can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, Angell, et al., *Scientific American* 248:44-55 (1983). In one embodiment, at least a portion of the system (for example, a base portion) is formed of silicon by etching features in a silicon chip. Technology for precise and efficient fabrication of devices of the invention from silicon is known. In another embodiment, the base section (or other sections) can be formed of a polymer, and can be an elastomeric polymer, or polytetrafluoroethylene (PTFE; Teflon®), or the like.

Different components can be fabricated of different materials. For example, a base portion of a microfluidic device, including a bottom wall and side walls, can be fabricated from an opaque material such as silicon or PDMS, and a top portion, or cover, can be fabricated from a transparent material such as glass or a transparent polymer for observation and control of the fluidic process. In some cases, an entire device or microfluidic system is formed of PDMS. Components can be coated so as to expose a desired chemical functionality to fluids that contact interior channel walls, where base supporting material does not have the precise, desired functionality. For example, components can be fabricated as illustrated, with interior channel walls coated with another material. Those of ordinary skill in the art can readily select a suitable material and/or coating based upon e.g., its rigidity, its inertness to (e.g., freedom from degradation by) a fluid to be passed through it, its robustness at a temperature at which a particular device is to be used, and/or its transparency/opacity to light (e.g., in the ultraviolet and visible regions).

In one embodiment, components of a fluidic system are fabricated from polymeric and/or flexible (e.g., deformable) and/or elastomeric materials, and may be optionally formed of a hardenable fluid, facilitating fabrication via molding (e.g. replica molding, injection molding, cast molding, etc.). The hardenable fluid can be essentially any fluid art that can be induced to solidify, or that spontaneously solidifies, into a solid capable of containing and transporting fluids contemplated for use in and with the microfluidic network structures. In one embodiment, the hardenable fluid comprises a polymeric liquid or a liquid polymeric precursor (i.e., a "prepolymer"). Suitable polymeric liquids can include, for example, thermoplastic polymers, thermoset polymers, or mixture of such polymers heated above their melting point; or a solution of one or more polymers in a suitable solvent, which solution forms a solid polymeric material upon removal of the solvent, for example, by evaporation. Such polymeric materials, which can be solidified from, for example, a melt state, by solvent evaporation or by catalysis, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1, 2-epoxide, or oxirane. For example, diglycidyl ethers of bisphenol A can be used, in addition to compounds based on aromatic amine, triazine, and cycloaliphatic backbones. Another example includes the well-known Novolac™ polymers. Examples of silicone elastomers suitable for use according to the invention include those formed from precursors including the chlorosilanes such as methylchlorosilanes, ethylchlorosilanes, and phenylchlorosilanes, and the like.

Silicone polymers may be used in one set of embodiments, for example, the silicone elastomer polydimethylsiloxane. Exemplary polydimethylsiloxane polymers include those sold under the trademark Sylgard® by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. First, such materials are inexpensive, readily available, and can be solidified from a prepolymeric liquid via curing with heat. For example, PDMSs are typically curable by exposure of the prepolymeric liquid to temperatures of about, for example, 65° C. to about 75° C. for exposure times of about, for example, 1 hour. Second, silicone polymers, such as PDMS, are elastomeric and are thus useful for forming very small features with relatively high aspect ratios, necessary in certain embodiments of the invention. Flexible (e.g. elastomeric) molds or masters can be advantageous in this regard.

Another advantage of forming microfluidic structures of the invention from silicone polymers, such as PDMS, is the ability of such polymers to be oxidized, for example by exposure to an oxygen-containing plasma such as an air plasma, so that the oxidized structures contain at their surface chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in Duffy et al., *Rapid Prototyping of Microfluidic Systems and Polydimethylsiloxane*, Analytical Chemistry, Vol. 70, pages 474-480, 1998, incorporated herein by reference.

Another advantage to forming microfluidic structures described herein (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials. Thus, devices of the invention can be made with surfaces that are more hydrophilic than unoxidized elastomeric polymers.

In one embodiment, a microfluidic channel may be made by applying a standard molding article against an appropriate master. For example, microchannels can be made in PDMS by casting PDMS prepolymer (Sylgard 184, Dow Corning) onto a patterned photoresist surface relief (a master) generated by photolithography. The pattern of photoresist may comprise the channels having the desired dimensions. After curing for ~3 hours at 65° C., the polymer can be removed from the master to give a free-standing PDMS mold with microchannels embossed on its surface.

Inlets and/or outlets can be cut out through the thickness of the PDMS slab. To form substantially enclosed microchannels, the microfluidic channels may be sealed in the following way. First, the PDMS mold and a flat slab of PDMS (or any other suitable material) can be placed in a plasma oxidation chamber and oxidized for 1 minute. The PDMS structure can then be placed on the PDMS slab with the surface relief in contact with the slab. The irreversible seal is a result of the formation of bridging siloxane bonds (Si—O—Si) between the two substrates that result from a condensation reaction between silanol (SiOH) groups that are present at both surfaces after plasma oxidation.

Though in some embodiments, systems of the invention may be microfluidic, in certain embodiments, the invention is not limited to microfluidic systems and may relate to other types of fluidic systems. "Microfluidic," as used herein, refers to a device, apparatus or system including at least one fluid channel having a cross-sectional dimension of less than 1 mm, and a ratio of length to largest cross-sectional dimension of at least 3:1. A "microfluidic channel," as used herein, is a channel meeting these criteria. In some cases, all of the channels of a microfluidic system are microfluidic channels.

The "cross-sectional dimension" (e.g., a diameter) of the channel is measured perpendicular to the direction of fluid flow. Many fluid channels in systems described herein have maximum cross-sectional dimensions less than 2 mm, and in some cases, less than 1 mm. In one set of embodiments, all fluid channels containing embodiments described herein are microfluidic or have a largest cross sectional dimension of no more than 2 mm or 1 mm. In another set of embodiments, the maximum cross-sectional dimension of the channel(s) containing embodiments described herein are less than 500 microns, less than 200 microns, less than 100 microns, less than 50 microns, or less than 25 microns. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel or capillary may be used.

A "channel," as used herein, means a feature on or in an article (substrate) that at least partially directs the flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (e.g., a concave or convex meniscus). The channel may be of any size, for example, having a largest dimension perpendicular to fluid flow of less than about 5 or 2 millimeters, or less than about 1 millimeter, or less than about 500 microns, less than about 200 microns, less than about 100 microns, or less than about 50 or 25 microns. Of course, the number of channels and the shape of the channels can be varied by any method known to those of ordinary skill in the art. Larger channels, tubes, etc. can be used in a microfluidic device for a variety of purposes, e.g., to store fluids in bulk and to deliver fluids to components of the invention.

The following examples are intended to illustrate certain embodiments of the present invention, but are not to be construed as limiting and do not exemplify the full scope of the invention.

Example 1

Control of Single-Layer (e.g., "Planar") Valves

Figure 3C:
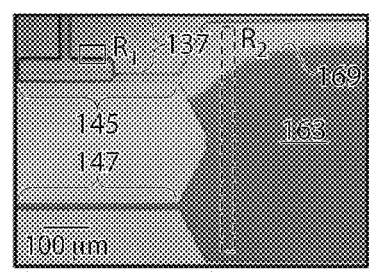
Figure 3D:
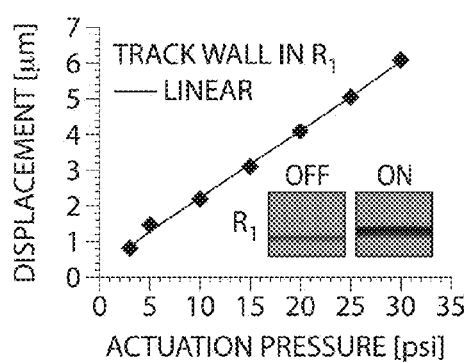
Figure 3E:
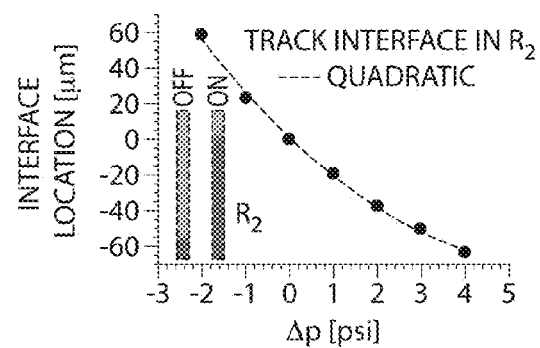

This example shows the control afforded by single-layer valves. FIG. 3A illustrates a top view of a single layer (e.g., "planar") valve. To quantify the single-layer valve control, the pressure drop in the constricted channel was measured as a function of the actuation pressure applied to the valve channel. To measure the actuation pressure, fixed input pressure was applied to the fluid channel while varying the actuation pressure of the valve channel. This action deflected the elastic PDMS membrane, which was optically measured by tracking the wall in R1, as shown in FIGS. 3B-3C. This method provided measurements of the wall deflection as a function of the valve actuation pressure, which was used to calibrate the device. To extract a smooth calibration curve, the data were fit to a line, as shown in FIG. 3D. The calibration enabled the optical measurement of the pressure used to actuate the valve.

A microfluidic differential manometer was used to measure the pressure drop across the constricted fluid channel. A differential manometer is a simple device which includes a measurement channel and a comparator channel, and the two channels empty into a large basin channel, as shown in FIGS. 3B-3C. To use the device, dyed and undyed miscible fluids were pumped through the channels at an equal pressure of 5 psi. Since the flows are laminar, a sharp interface formed in the basin channel where the pressures of the fluids were equal. When the valve was not actuated, the interface formed at the geometrical center of the basin, as shown in FIG. 3B. By contrast, when the valve was actuated, the pressure of the clear fluid, which had moved through the constricted measurement channel, was lower than that of the dyed fluid, which had moved through the unconstricted comparator channel, and the interface moved upwards to compensate, as shown in FIG. 3C. Therefore, after calibration, the location of the interface afforded a measurement of the pressure drop along the measurement channel.

To calibrate the device, the pressure of the comparator channel was held constant while varying the pressure of the measurement channel and recording the pressure difference between the upper and lower channels, $\Delta p$. Simultaneously, the location of the interface was tracked in the region R2. This provided calibration data for the interface location as a function of $\Delta p$, depicted by the example data in FIG. 3E. The data were fit to a parabola to extract a smooth calibration curve, and the simultaneous measurements of wall deflection and interface location enabled the optical measurement of the pressure drop across the measurement channel as a function of the valve actuation pressure, which was used to quantify the valve performance.

Example 2

Performance of Single-Layer Valves

This example shows the effect of crosslinking density and channel dimensions on the pressure drop across a constricted channel as a function of the pressure used to actuate a valve constricting the channel.

Valves such as those shown in FIG. 3A-3C can control flow by constricting microchannels. The performance of a valve depends on the physical properties of both the valve and the channel to be deformed, which can be understood from the approximation for pressure-driven laminar flow in a high-aspect ratio channel: $\Delta p \propto vl/w^3h$; where $\Delta p$ is the pressure drop along a microchannel (e.g., channel section 145 of FIG. 3A), v is the fluid flow rate, l is the channel length, w is the channel width, and h is the channel height, with w<<h. The approximation highlights the key properties of channel cross-sectional area and aspect ratio.

To determine the importance of the flexibility of a PDMS membrane (e.g., positioned between a control channel and the channel to be constricted), the concentration of crosslinker, which effects the flexibility of PDMS, was varied in the device. Performance curves for devices with crosslinker concentrations of 1.3%, 6.7%, 8.3%, and 10% and having dimensions of w=40 μm, l=400 μm, and h=41 μm of the channel to be constricted (e.g., channel section 145 of FIG. 3A) are shown in FIG. 4C. The curves for devices made with lower concentrations of crosslinker (e.g., soft devices) were steeper than for devices made with higher concentrations of crosslinker (e.g., stiff devices), demonstrating that soft devices afford a larger pressure drop and greater control over the pressure.

The pressure drop across a channel (e.g., channel section 145 of FIG. 3A) also depends on its aspect ratio, which was altered by varying channel width while holding the length, height, and crosslinker density constant at 400 μm, 41 μm, and 8.3%, respectively (FIG. 4B), and by varying channel height while holding the width, length, and crosslinker density constant at 40 μm, 400 μm, and 8.3%, respectively (FIG. 4D). In both cases, performance curves for high aspect ratio channels were steeper than for low aspect ratio channels, demonstrating that high-aspect ratio channels afford greater control over the pressure. The pressure drop also depends on the length of the channel constriction, which was altered by varying the length of the valve (e.g., length 176 as shown in FIG. 3A) while holding the width, length, and crosslinker concentration constant at 40 μm, 41 μm, and 8.3%, respectively (FIG. 4A). Performance curves for long valves were steeper than for short valves, demonstrating that long valves afforded greater control over the pressure. Thus, high aspect ratio channels and long valves fabricated in soft PDMS are may be advantageous for certain applications.

Example 3

Quantification of the Range and Precision of Flow Rate Control Using Planar Valves This example shows the operation of a continuous flow control microfluidic device in which the total flow rate through the device was 1000 μL/hr. To quantify the range and precision of flow rate control afforded by single-layer valves, the device shown in FIG. 5A was fabricated. The device included two parallel channels (e.g., channel section 182 and portions of channel section 184) that branch off from a delivery channel 181, with the flow rates along the channel sections being controlled using a valve 186. To use the device, the total flow rate through both channel sections was fixed at 1000 μL/hr using a syringe pump. When the valve was actuated, the flow rate in the channel section 182 was reduced while the flow rate in channel section 184 was increased. The velocity profiles for a sequence of actuation pressures was measured using Particle Imaging Velocimetry (PIV). For the PIV, 1 μm polystyrene tracer particles were imaged at the vertical center of the channels using a 40× objective with a 2 μm depth of field. An example image of the flowing tracer particles is shown in FIG. 5B. The velocity profiles were plug-like due to the low aspect ratio of the channels, as shown in FIG. 5C. To determine whether this flow control was continuous, the average flow speeds for channel sections 182 and 184 were calculated by integrating the profiles and plotted as a function of the valve actuation pressure, as shown in FIG. 5D. The flow speeds were linear as a function of the valve actuation pressure, demonstrating continuous flow rate control using the valve. Moreover, the flow rate was able to be changed in 5 msec using the planar valve, indicating this control had a fast response time relative to a syringe pump in which flow changes can take minutes to stabilize.

Example 4

Valve-Based Flow Focusing

This example shows the use of single-layer valves to modulate the geometry of microfluidic flow focusing droplet makers.

Single-layer valve devices were fabricated as shown in FIGS. 9A and 9B using the principles of soft-lithography.

The devices were molded into a slab of PDMS and bonded to a glass slide, which formed the bottom plate of the channels. The single-layer valves included dead-end control channels molded into the PDMS slab. The control channels were fabricated as "T" shaped channels. FIGS. 9A and 9B show valves 424 associated with a main channel 426 positioned downstream of a subject fluid channel 412 and continuous fluid channels 418. This channel configuration can be used to control droplet size, e.g., an "AM droplet maker". With the main channel fully opened, droplets having a diameter of 35 µm could be produced.

FIGS. 12A and 12B show valves 524 associated with continuous fluid channels 518. This channel configuration can be used to control the frequency of droplet production, e.g., an "FM droplet maker". With the continuous channels fully opened, droplets could be produced at a frequency of 25 Hz. The device shown in FIGS. 12A and 12B were fabricated with bypass channels in fluid communication with continuous fluid channels 518.

By pressurizing the control channels, a thin elastomeric membrane separating the control channels from the fluid channel(s) (e.g., the main channel in FIG. 9 and the continuous fluid channels in FIG. 12) was deflected laterally, constricting the fluid channel and regulating flow. For example, this actuation caused constriction of the main channel of the AM droplet to produce droplets having a diameter of 13 µm (FIG. 9B). Actuation of the valves resulted in constriction of the continuous channels of the FM droplet maker to produce droplets at a frequency of 20 Hz (FIG. 12B). In these single-layer valve devices, the control channels existed in the same horizontal plane as the fluid channels, enabling the entire microfluidic device to be fabricated in a single stamp using single-layer soft lithography. The flow rates for the AM droplet maker were 5 µl/hr for the subject fluid and 300 µl/hr for the continuous fluid, and the flow rates for the FM droplet maker were 10 µl/hr for the subject fluid and 100 µl/hr for the continuous fluid.

Referring to the FM droplet maker, the rate at which droplets were produced was proportional to the flow rate of the continuous fluid as it was injected into the interconnected region where the subject fluid channel and continuous fluid channels meet. To control droplet production frequency, the valves were positioned adjacent the continuous fluid channels, as shown in FIG. 12A. When the valve was not actuated, the continuous fluid channels were fully open so that the flow injection speed was at a maximum and the droplets were produced at a fast rate, as shown in FIG. 12A. By contrast, when the valves were actuated, the continuous fluid channels were constricted and the bypass channels allowed excess fluid to circumvent the flow-focusing region (including the interconnected region). The flow rate of the continuous fluid was thus reduced into the interconnected region so that droplets were produced at a slow rate (FIG. 12B). This configuration will be referred to as frequency modulation (FM) valve-based flow-focusing.

To investigate the control afforded by AM and FM valve-based flow-focusing, the droplet train characteristics were measured as a function of valve actuation. The lateral displacement of the membrane was linear as a function of the valve actuation pressure, because of the elastomeric nature of the PDMS and as demonstrated by the linear trend of channel diameter as a function of valve actuation pressure for the AM configuration in FIG. 10. Also in the AM configuration, reduction of the channel diameter resulted in non-linear reduction of the droplet diameter, as shown by the non-linear trend in FIG. 10. Nevertheless, for fixed actuation and channel size, monodisperse droplets of a fixed size were produced, as shown by the droplet size distributions for different valve actuations in FIG. 10. Similarly, for the FM configuration, actuation of the valve afforded control over the periodicity of the droplet train with a general trend of reducing the droplet frequency as the continuous channels narrow, though this control was less precise than for the AM device.

The hydrodynamics at the flow-focus junction were governed by the boundary conditions set by the channel geometry, which can be controlled by actuation of the valves. Moreover, because of the laminar flow, the response time of the fluid to changes in boundary condition was very fast. This combination afforded real-time control over droplet train properties and was useful for droplet manipulation, especially for controlling the formation of droplets, actively controlling the paths of droplets, and synchronizing or interdigitating co-flowing streams of droplets.

As a demonstration, time-varying signals were encoded into droplet trains for both the AM and the FM configurations. Oscillating actuation pressures were applied to the valves, and the resulting properties of the droplets were monitored. For the AM configuration, the non-linear dependence of the droplet diameter on the channel diameter resulted in a distortion of the encoded signal, as shown by comparison of the controlled and encoded signals in FIG. 11*a*. Nevertheless, the time-variation of the pressure signal was transferred to the train as the amplitude modulation of the droplets, as shown by the periodic correspondence of the two curves in FIG. 11*a*. Similarly, in the FM configuration the oscillating valve actuation modulated the frequency of the droplet train, albeit with less precision, as shown by the correspondence of the curves in FIG. 14.

To quantify this correspondence between the control and encoded signals, the auto-power spectra of the raw time signals were compared. For the AM flow-focusing, the power spectra of channel diameter and droplet diameter tracked one another up to about 2 Hz, demonstrating the signals below 2 Hz were encoded in high fidelity, as shown in FIG. 11 and also by the zero-delay normalized cross-correlation value of 0.87. For the FM configuration, the spectra tracked each other to a maximum frequency of only about 0.2 Hz, so that for this configuration only the lowest tones were encoded, as shown in FIG. 14, and by the smaller zero-delay normalized cross-correlation value of 0.80.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    without the need to change a cross-sectional dimension of a channel of a microfluidic system during use, producing in the microfluidic system a series of single, substantially uniform droplets having a first volume and comprising a subject fluid, the droplets being surrounded by a continuous liquid; and
    changing a cross-sectional dimension of a channel of the microfluidic system so as to produce droplets comprising the subject fluid having a second volume different from the first volume.

2. A method as in claim 1, comprising producing droplets of the second volume at the same frequency as the frequency of production of droplets of the first volume.

3. A method as in claim 1, comprising producing droplets of the second volume at a frequency different from the frequency of production of droplets of the first volume.

4. A method as in claim 1, comprising applying substantially constant flow rates of the subject fluid and the continuous fluid during production of the droplets of first and second volumes.

5. A method as in claim 1, wherein changing the cross-section of a channel of the microfluidic system comprises changing a cross-section of a subject fluid channel containing the subject fluid.

6. A method as in claim 1, wherein changing the cross-section of a channel of the microfluidic system comprises changing a cross-section of a continuous fluid channel containing the continuous fluid.

7. A method as in claim 1, wherein changing the cross-section of a channel of the microfluidic system comprises changing a cross-section of a main channel adjacent and downstream of an interconnected region where a subject fluid channel and a continuous fluid channel meet.

8. A method as in claim 1, wherein the subject fluid comprises a liquid.

9. A method as in claim 1, wherein the subject fluid comprises a gas.

10. A method as in claim 1, wherein each of the continuous fluid and subject fluid has a flow rate, and the ratio of the flow rate of the subject fluid to the continuous fluid being less than 1:5.

11. A method as in claim 1, further comprising introducing a carrier fluid in the microfluidic system and creating a droplet comprising the subject fluid and the continuous fluid.

* * * * *